United States Patent
Green

(10) Patent No.: US 10,787,626 B2
(45) Date of Patent: Sep. 29, 2020

(54) NUT OIL SEPARATION SYSTEM AND METHOD AND PRODUCTS RESULTING THEREFROM

(71) Applicant: Sonoita Pecan Company, LLC, Sonoita, AZ (US)

(72) Inventor: Fletcher G. Green, Sonoita, AZ (US)

(73) Assignee: Sonoita Pecan Company, LLC, Sonoita, AZ (US)

( * ) Notice: Subject to any disclaimer, the term of this patent is extended or adjusted under 35 U.S.C. 154(b) by 237 days.

(21) Appl. No.: 15/713,288

(22) Filed: Sep. 22, 2017

(65) Prior Publication Data

US 2018/0079991 A1  Mar. 22, 2018

Related U.S. Application Data

(60) Provisional application No. 62/398,025, filed on Sep. 22, 2016.

(51) Int. Cl.
| | |
|---|---|
| *C11B 3/02* | (2006.01) |
| *A23L 25/00* | (2016.01) |
| *A23D 9/04* | (2006.01) |
| *C11B 1/04* | (2006.01) |
| *C11B 1/10* | (2006.01) |
| *C11B 3/00* | (2006.01) |

(52) U.S. Cl.
CPC .............. *C11B 3/02* (2013.01); *A23D 9/04* (2013.01); *A23L 25/30* (2016.08); *C11B 1/04* (2013.01); *C11B 1/10* (2013.01); *C11B 3/008* (2013.01); *A23V 2002/00* (2013.01)

(58) Field of Classification Search
CPC ..... C11B 3/02; C11B 1/04; C11B 1/10; C11B 3/008; A23L 25/30; A23D 9/04; A23V 2002/00

See application file for complete search history.

(56) References Cited

U.S. PATENT DOCUMENTS

| 3,903,311 A | 9/1975 | Billerbeck et al. |
| 5,079,027 A | 1/1992 | Wong et al. |

(Continued)

FOREIGN PATENT DOCUMENTS

| WO | 2006000030 | 1/2006 |
| WO | 2013/151652 | 10/2013 |

OTHER PUBLICATIONS

International Preliminary Report on Patentability in the International Application No. PCT/US2017/053008 dated Apr. 4, 2019.

(Continued)

*Primary Examiner* — Cephia D Toomer
(74) *Attorney, Agent, or Firm* — Snell & Wilmer L.L.P.

(57) ABSTRACT

A system and method for the separation of nut or seed oil from shelled nuts or seeds are disclosed. The method comprises the grinding of shelled nuts or seeds and at least one carbohydrate for a length of time sufficient to promote nut or seed oil separation, leaving behind defatted nut or seed dough that can be further processed into a food product such as snack bar or nut milk. A system for the separation of nut or seed oil from shelled nuts or seeds comprises sources for both shelled nuts or seeds and at least one carbohydrate, and a grinding unit comprising at least one movable member, optional stationary member, and a vessel.

15 Claims, 2 Drawing Sheets

(56) References Cited

U.S. PATENT DOCUMENTS

Figure 1:
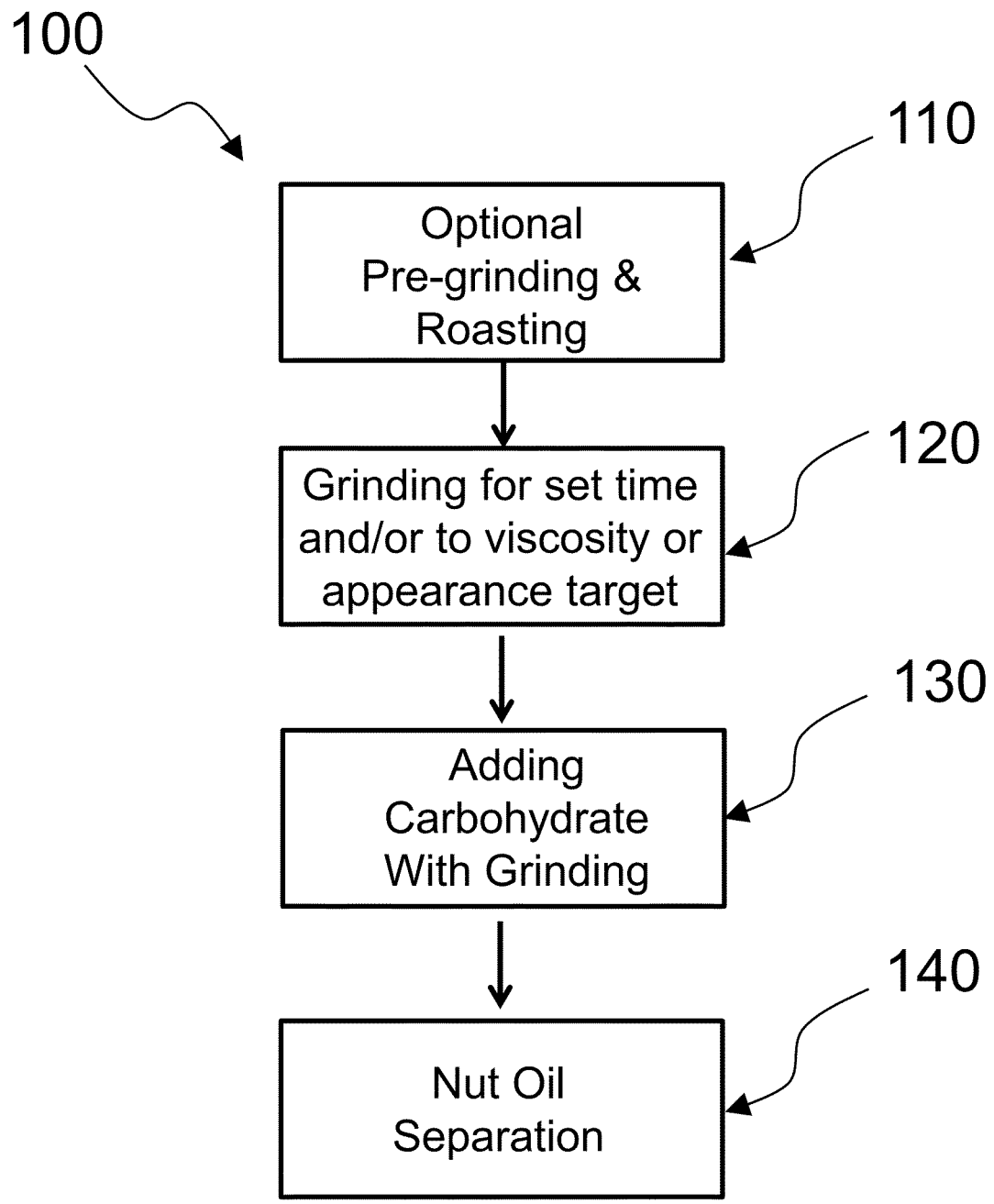

| | | | |
|---|---|---|---|
| 5,164,217 A | | 11/1992 | Wong et al. |
| 5,498,438 A | * | 3/1996 | Strong .................... A23L 25/30 |
| | | | 426/517 |
| 5,667,838 A | | 9/1997 | Wong et al. |
| 5,885,645 A | | 3/1999 | Wong et al. |
| 6,136,366 A | * | 10/2000 | Liedl, Jr. ................. A23L 25/10 |
| | | | 426/633 |
| 2003/0104111 A1 | | 6/2003 | Liedl, Jr. et al. |
| 2004/0081744 A1 | | 4/2004 | Liu et al. |

OTHER PUBLICATIONS

PCT; International Search Report dated Dec. 11, 2017 in PCT Application No. PCT/US2017/053008.
PCT; Written Opinion of the International Searching Authority dated Dec. 11, 2017 in PCT Application No. PCT/US2017/053008.

* cited by examiner

NUT OIL SEPARATION SYSTEM AND METHOD AND PRODUCTS RESULTING THEREFROM

CROSS-REFERENCE TO RELATE APPLICATIONS

This application claims priority to U.S. Provisional Patent Application Ser. No. 62/398,025 filed Sep. 22, 2016, entitled "Nut Oil Separation System and Method and Products Resulting Therefrom," the disclosure of which is incorporated herein by reference in its entirety.

FIELD OF THE INVENTION

This invention relates generally to recovery of nut oil from nuts and in particular to a system and method of separating nut oil from nuts by grinding nuts in the presence of a carbohydrate and the co-products resulting therefrom.

BACKGROUND OF THE INVENTION

Many methods are known for separating oils from nuts, with at least one method dating back to antiquity. An ancient method utilizes a press to manually force oil from nuts. However, the method, at least without modernization, is limited to soft materials having high oil content, such as olives (a fruit) and sesame (a seed). Such "cold press" methods are known to produce the purest virgin oils, even certified organic oils, given that no known processing is involved that could alter the composition of the oil.

The more modern rendition, expeller pressing, can at least in theory provide oils of altered compositions compared to cold press oils, due to the inherent heating in automated machinery and the after-pressing filtering and refining. Mechanical methods such as cold press and expeller press provide only moderate oil yields. Further, various mechanical press methods for nut oil separation often result in unusable nut by-product, such as a perishable meal, instead of a nut dough that can be processed into commercially useful foods. These extrusion-type methods of nut oil extraction are generally used by only small to medium sized producers.

In an effort to increase oil yield, streamline and scale-up production while reducing cost, several modern methods for separating nut oil from nuts have recently been developed. These methods generally involve solvent extraction of nut oil using light petroleum solvents or $CO_2$, and can be categorized into ambient and supercritical extraction methods.

Ambient solvent extraction of nut oil from nuts uses of one or more light petroleum solvents to dissolve and/or emulsify the oil, such as for example, hexane. After hexane or other solvent is mixed with nuts, the solvent/oil emulsion is separated from the nut dough and then the solvent is removed from the oil. Unfortunately, although hexane solvent extraction of nut oil is very efficient as to yield, the method is currently not amenable to production of certified organic nut oil due to the nature of hexane and the belief that some of this suspected carcinogen remains in the nut oil. Further, the co-product is so extensively defatted it is typically useful for only nut flour production, and it may also retain solvent residue.

Supercritical $CO_2$ extraction of nut oil from nuts offers a cleaner, arguably safer, and more environmentally friendly extraction method compared to extraction with hexane or other hydrocarbon solvents. However, the machinery is expensive, and setting up a large commercial process would require considerable capital investment.

The most recently disclosed method of recovering nut oil was developed by the Ambient Temperature Extraction Partners in conjunction with Oklahoma State University (referred to as OSU/ATEP), and it utilizes propane as the extracting solvent. The developers argue the method is as efficient as hexane extraction, does not use a suspected carcinogen, and is much less expensive to operate than supercritical $CO_2$ extraction because of the ambient nature of the process. However, the method does not appear to be tested in any large scale operations to date.

In view of the shortcomings of these known methods from ancient to modern, new systems and methods for separating nut oil from nuts remain desirable. New methods are needed that are safer, nontoxic, environmentally friendly, cleaner, and less expensive, and which are able to provide certified organic nut oil, a commercially useful nut dough co-product, and which are adaptable to large scale production.

SUMMARY OF THE INVENTION

In various embodiments, a method of separating nut oil from nuts comprises the step of grinding a mixture of at least one variety of shelled nuts and at least one carbohydrate for a length of time sufficient to promote nut oil separation. In certain embodiments, a method of separating seed oil from seeds comprises the step of grinding a mixture of at least one variety of seeds and at least one carbohydrate for a length of time sufficient to promote seed oil separation. In further aspects, a method of separating legume oil from legumes such as soybeans comprises the step of grinding a mixture of at least one variety of legume and at least one carbohydrate for a length of time sufficient to promote legume oil separation.

In other aspects, a non-extraction and non-extrusion method of separating nut oil from shelled nuts comprises: grinding at least one variety of shelled nuts into coarse or fine particulate nut meats or nut butter; producing a mixture of at least one carbohydrate and said coarse or fine particulate nut meats or nut butter by adding a source of at least one carbohydrate to said coarse or fine particulate nut meats or nut butter; grinding said mixture for a length of time sufficient to promote nut oil separation from defatted nut dough; and recovering the separated nut oil in a yield based on the oil content of said nuts.

The present disclosure also provides for a system for the separation of nut oil from nuts, said system comprising: a source of shelled nuts; a source of at least one carbohydrate; and a grinding unit in communication with said sources to receive said shelled nuts and said at least one carbohydrate, said grinding unit comprising at least one movable member; optional stationary member; and a vessel.

In various aspects of the invention, nut oil having composition at least somewhat different from nut oil obtained by extraction or extrusion methods is produced by grinding together a mixture of at least one variety of nuts and at least one carbohydrate for a length of time sufficient to separate nut oil. In various embodiments, nut oil separated by the methods disclosed herein contains some particulate matter that causes the chemical composition to be somewhat different from, for example, cold pressed oil. In certain embodiments, filtering of the oil obtained by the present method, which removes this particulate matter rich in protein and fat, results in nut oil that is essentially indistinguishable from nut oil obtained by the various extraction or extrusion methods such as cold press.

In various embodiments of the present disclosure, a commercially useful, defatted nut dough remains after separation of oil in accordance to the methods herein. The nut oil separation methods herein result in nut dough product comprising a reduced amount of fat, but with more fat than the co-products resulting from expeller press or solvent extraction methods. The reduced fat level of nut dough produced by the methods disclosed herein makes it an ideal starting material for snack foods and nut milk production, such as for example, almond milk. Solvent extraction and super critical fluid extraction of nut oil leaves behind a cake of essentially defatted material that finds little commercial use other than for production of nut flour.

In various embodiments, a method of separating nut oil from nuts is disclosed. The method comprises grinding a mixture of at least one variety of shelled nuts and at least one carbohydrate for a length of time sufficient to promote nut oil separation from the corresponding defatted nut dough. The variety of nuts may be selected from the group consisting of almonds, pecans, walnuts, cashews, pistachios, peanuts, kola nuts, palm nuts, hazelnuts, filberts, Brazil nuts, macadamia nuts, chestnuts, and mixtures thereof. The carbohydrate may be chosen from the group consisting of a monosaccharide, a disaccharide, an oligosaccharide, and mixtures thereof. The carbohydrate may also comprise at least one of D-fructose, D-glucose, and sucrose. The carbohydrate may also comprise at least one of honey, corn syrup, high fructose corn syrup, maple syrup, agave syrup, cane syrup, simple syrup, molasses, brown rice syrup, glucose syrup, tapioca syrup, rice bran syrup, malt syrup, sorghum, guar gum, treacle, panela, carob syrup, fruit juice, fruit juice concentrate, and fruit reduction. The carbohydrate may be present at from about 5% to about 35% by weight, based on the total weight of the shelled nuts and carbohydrate.

In various embodiments, the length of time sufficient to promote nut oil separation is less than about 30 minutes, and in some aspects, less than about 10 minutes. The method may further comprise a step of grinding said at least one variety of shelled nuts in the absence of carbohydrate prior to the step of grinding the mixture of the at least one variety of shelled nuts and the at least one carbohydrate. The grinding in the absence of carbohydrate may be for a length of time sufficient to convert said at least one variety of shelled nuts into nut butter. This butter may have a viscosity of from about 3,000 cps to about 5,000 cps when measured at a temperature of from about 88° F. to about 93° F., and also may have an internal temperature of from about 88° F. to about 93° F. The length of time sufficient to convert said at least one variety of shelled nuts into nut butter may be from about 25 minutes to about 35 minutes.

The grinding in the method may comprise the shearing of the nuts and at least one carbohydrate between stone rollers and stone plate in a motor-driven stone melanger. If filtered, the nut oil recovered in the method may be substantially identical to the corresponding expeller-pressed nut oil.

In various embodiments, a non-extraction, non-extrusion method of separating nut oil from shelled nuts is disclosed. The method comprises: grinding at least one variety of shelled nuts into nut butter; producing a mixture of at least one carbohydrate and said nut butter by adding a source of at least one carbohydrate to said nut butter; grinding said mixture for a length of time sufficient to promote nut oil separation from defatted nut dough; and recovering the separated nut oil in a yield based on the theoretical oil content of said nuts. The step of grinding at least one variety of shelled nuts into nut butter may be for a length of time sufficient to produce nut butter having a viscosity of from about 3,000 cps to about 5,000 cps when measured at a temperature of from about 88° F. to about 93° F. In various aspects, the initial grinding prior to carbohydrate addition produces a creamy-textured nut butter from the nuts, which resembles nut butter but is creamier. In certain embodiments, the viscosity target range coincides with this creamy textured nut butter stage.

The source of at the least one carbohydrate may be at least one of honey, corn syrup, high fructose corn syrup, maple syrup, agave syrup, cane syrup, simple syrup, molasses, brown rice syrup, glucose syrup, tapioca syrup, rice bran syrup, malt syrup, sorghum, guar gum, treacle, panela, carob syrup, fruit juice, fruit juice concentrate and fruit reduction. In the method, the variety of shelled nuts is at least one of almonds, pecans, walnuts, cashews, pistachios, peanuts, kola nuts, palm nuts, hazelnuts, filberts, Brazil nuts, macadamia nuts, and chestnuts.

In various embodiments of the method, the length of time sufficient to promote nut oil separation from defatted nut dough is less than about 30 minutes. Further, the mixture may comprise a w/w ratio of shelled nuts to carbohydrate of from about 9:1 to about 7:3, although the optimal ratio may change from these ranges based on the characteristics of the nuts or seeds used in the method, such as, for example, their density, fiber content, protein content, and/or fat content. The yield of nut oil from the method may be from about 25% to about 80%.

In various embodiments of the method, a defatted nut dough is produced as a co-product. The defatted nut dough may comprise from about 15% by weight to about 30% by weight total sugars, as sucrose, based on the total weight of the defatted nut dough. The nut dough is usable as a food snack, or can be further processed into food items such as snack bars, or used for the production of nut milk.

In various embodiments, a system for the separation of nut oil from nuts is disclosed. The system comprises: a source of shelled nuts; a source of at least one carbohydrate; and a grinding unit in communication with said sources to receive said shelled nuts and said at least one carbohydrate, said grinding unit comprising at least one movable member; an optional stationary member, and a vessel. In the system, the grinding unit may comprise a motor-driven stone melanger. In certain aspects, the system may further comprise an outlet for recovering the separated nut oil.

BRIEF DESCRIPTION OF THE DRAWING FIGURES

Figure 2:
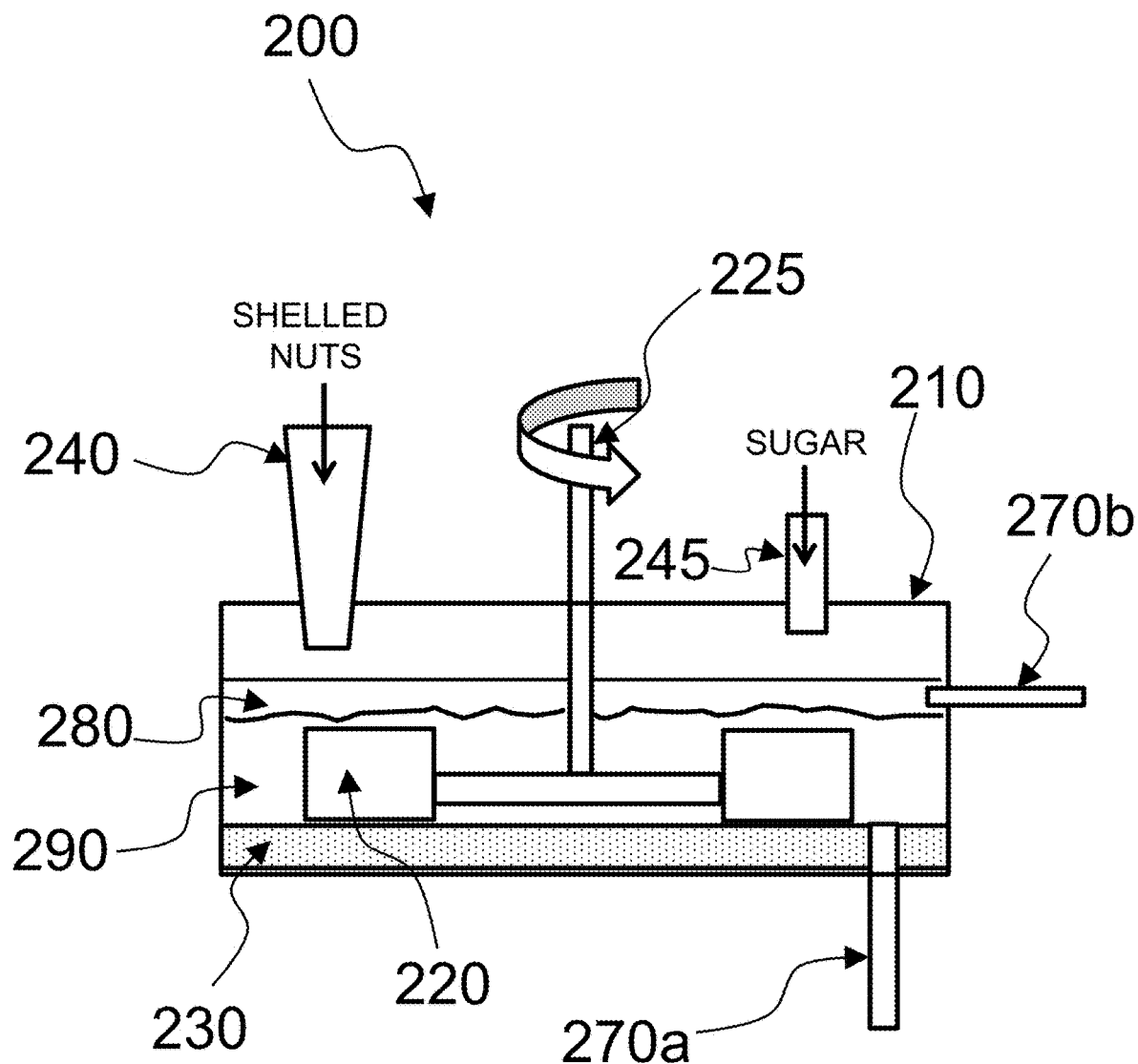

FIG. 1 is a flowchart representation of an embodiment of the present method for separating nut oil from nuts; and FIG. 2 is an embodiment of a nut oil separation system.

DETAILED DESCRIPTION OF THE INVENTION

The present disclosure generally provides novel systems and methods for separating nut oil from nuts, and provides a commercially useful by-product therefrom. The present disclosure also includes separation of seed oil from seeds, and legume oil, such as soybean oil, from legumes. In various embodiments of the present disclosure, a method for separating nut oil from nuts comprises grinding together a mixture of at least one variety of nuts and at least one carbohydrate for a length of time sufficient to promote nut oil separation. The method is heretofore believed to be entirely unknown, and in many regards is seen as counterintuitive. The grinding of nuts is a well-known process for making homogeneous nut butters having a creamy consistency, and the addition of various flavorings and sweeteners, including for example, sugar, should have no effect on oil separation at all, or such additions may be predicted to stabilize the nut butter and retard oil separation. Consequently, it was surprising and unexpected to discover that grinding shelled nuts in the presence of at least one carbohydrate resulted in rapid separation of nut oil.

In various embodiments of the present disclosure, a method for separating nut oil from nuts comprises grinding together a mixture comprising at least one variety of nuts and at least one carbohydrate for a length of time sufficient to promote nut oil separation. The present disclosure also provides a system for the separation of nut oil from nuts, and a commercially useful product, nut dough, in addition to the nut oil derived from the system and method herein.

Not wishing to be bound by any particular theory, it remains possible that organic reactions occur between the nut proteins and the carbohydrate, such as for example, Maillard reactions, and that the reaction products are no longer able to homogenize with the oil as did the unreacted/non-complexed proteins. The observance that reducing sugars seem to work well in the present method supports this notion, although the carbohydrate choice to induce nut oil separation remains somewhat empirical.

Nuts for use in the system and method herein are typically shelled, and optionally chopped into pieces, pre-ground, and/or toasted or roasted prior to grinding in the presence of a carbohydrate for oil separation. In various aspects, less expensive nut pieces are used as the starting material rather than the more expensive whole nuts. In various embodiments, nuts are ground in the absence of carbohydrate for a period of time and/or to a set viscosity target, and then a carbohydrate is added while grinding is continued to trigger the oil separation. A wide variety of nuts and seeds and a broad range of carbohydrates find use in the present system and method. Lengths of time sufficient to promote nut oil separation while grinding are generally less than about 30 minutes, typically less than about 15 minutes and frequently less than about 10 minutes. The length of time sufficient to promote nut oil separation depends, inter alia, on the granularity of the nuts, and their ability to granulate, which is dependent on nut oil, protein and fiber content and whether the nut was pre-ground, sliced, toasted or roasted, which in turn depends on the extent of pre-grinding of the nuts prior to addition of at least one carbohydrate. The entire process may be run at ambient temperature. Some internal heating is generally observed during the process even when the process is run without external heating or external cooling, perhaps the consequence of the friction from grinding. Yields of nut oil after separation of oil in accordance to the present methods are typically >50%, >60%, and in some examples, >70%, based on the theoretical amount of oil present in the nut(s) processed. Oil separated in accordance to the present system and method leaves behind a co-product referred to herein as "dandy," "nut dough," or "defatted nut dough." The oil content of the nut dough co-product is predictable and may be calculated by taking the mathematical difference between the theoretical (or assayed) amount of oil in a particular species/harvest of nut and the amount of nut oil recovered from the present nut oil separation system and method. Both the nut oil and the defatted nut dough are commercially useful products, and each are described in more detail herein below.

The Nuts

Nuts for use in the methods disclosed herein include any tree nut, seed or legume, including any species of any genus of nuts, legumes, or seeds, and any mixtures thereof. A single varietal or species may be used, or any conceivable mixtures of nuts, or mixtures of nuts and legumes, or combinations of tree nuts, seeds and legumes. As used herein, nuts may include, but are not limited to, almonds, pecans, walnuts, cashews, pistachios, peanuts, kola nuts, palm nuts, hazelnuts, filberts, Brazil nuts, macadamia nuts, chestnuts, and mixtures thereof. It is also within the scope of the present disclosure to use seeds in the oil extraction methods, such as for example, sesame seeds, pine nuts, sunflower seeds, safflower seeds, cottonseeds, grape seeds, corn kernels, rapeseeds, or pumpkin seeds, to obtain the corresponding seed oil. In other aspects, it is also within the scope of the present disclosure to use legumes such as soybeans in the oil extraction method.

The term "nut" as used herein refers broadly to any tree nut, seed or legume, particularly since there may be some confusion as to whether a particular "nut" in ordinary parlance is actually a seed or perhaps a legume. For example, whether an almond is technically a seed, or a peanut technically a legume, for the sake of simplicity herein they are both referred to as "nuts." A nut suitable for use in the present methods may have any natural oil content whatsoever, (e.g. from <1 weight % ("wt. %") to >99 wt. % oil, based on the weight of the nuts). In the academic and dietary literature, for example, the oil content in a nut may be referred to as the "fat" content. The simplicity and inexpensive nature of the system and method herein justify using nuts even having low oil content. For example, it may be highly marketable and desirable to use the present system and method for the separation of chestnut oil from chestnuts, even though chestnuts contain less than 10 wt. % oil. The choice of nut for oil separation may address, for example, a particular commercial need, such as a culinary trend, and therefore, the wt. % oil content naturally occurring in the nut may be inconsequential to the choice of nut.

Most nuts have documented oil content, such as by wt. % and/or fatty acid distribution. Between the more familiar nuts including almonds, pecans, walnuts, cashews, pistachios, peanuts, hazelnuts, macadamia nuts, and chestnuts, the macadamia nut has the highest oil content (>70 wt. %) and chestnuts the lowest (close to "fat free"). The oil content in any nut will vary yearly, by species (e.g. English versus black walnut), and by terroir. One report suggests the following total oil content in various nuts: almonds (52 wt. %); cashews (46 wt. %); hazelnuts (63 wt. %); macadamia nuts (74 wt. %); peanuts (49 wt. %); pecans (68 wt. %); pistachios (48 wt. %); and walnuts (62 wt. %), (see Organic and Biological Chemistry, H. Stephen Stoker, $6^{th}$ Edition, Chapter 8 (Lipids), p. 326, Cengage Learning, 2012). Reported amounts such as these can be used in calculating approximate yields for oil recovery in accordance to the present system and method.

Seeds also have documented oil content. For example, sunflower seeds have an average of about 28 wt. % oil content. As with tree nuts, the amount of seed oil in a particular seed can vary widely by species. One species of pumpkin seeds, *Curcurbita maxima* Shintosa for example, has a reported total oil content of about 37 wt. %, whereas the fluted pumpkin seed species *Telfairia occidentalis* contains a remarkable 64.4 wt. % oil content, (see, for example, D. J. Stevenson, et al., "Oil and Tocopherol Content and Composition of Pumpkin Seed Oil in 12 Cultivars," *J. Agric. Food Chem.*, 2007, 55, 4005-4013). Seeds find particular use in the present method and provide the corresponding seed oil.

Soybeans are also a well known source of vegetable oil and contain from about 18-20 wt. % oil. Expeller pressing can typically yield about 12-13 wt. % oil. Legumes, such as soybeans, also find use in the oil recovery methods herein.

In general, the more oil a nut, seed or legume naturally contains the more oil potentially separable from that nut, seed or legume according to the present system and method. However, actual yield of oil for different nuts using the system and method herein may vary for other reasons, such as for example, the ability for a particular variety of nut to granulate and further grind into a creamy butter consistency prior to addition of the carbohydrate. Further, oil recovery can vary at least somewhat with the amount of carbohydrate used in the process. For example, in certain embodiments there can be an inverse relationship between the amount of carbohydrate used in the method and the amount of oil obtained. In some cases the less carbohydrate used the more oil extracted from the nuts. Extraction of seed and legume oils may also vary across species, such as due to the natural oil content.

Pecan oil is the edible oil extracted from the pecan nut. One academic article reports the oil content in pecans to be 58.1%±2.8 (see E. Ryan, et al., *Int'l J. of Food Sciences and Nutrition*, May/June 2006; 57(3/4); 219-228). Other reports (such as mentioned above) disclose an oil level as high as about 68 wt. %. Pecan oil is considered "lighter" than most nut, seed, and fruit (e.g. olive) oils, except perhaps for canola and rapeseed oils, and consists mostly of unsaturated fats. For at least this reason, Pecan oil is commercially sought after. Walnut oil is another specialty product that has recently grown in culinary popularity.

The Carbohydrate

In the present method for separating nut oil from nuts, at least one carbohydrate is used to promote oil separation. As used herein, the term "carbohydrate" broadly refers to any monosaccharide, disaccharide, or oligosaccharide, whether the substance conforms to the strict formula $C_nH_{2n}O_n$ (i.e. "hydrated carbon," $C_n(H_2O)_n$) or not. Carbohydrates for use herein also include sugar alcohols, oxidized sugars, deoxygenated sugars, hydrogenated sugars, acetylated sugars, tautomerized sugars, hydrolyzed sugars, and any sugars having any number of additional heteroatoms besides oxygen, such as for example, nitrogen, sulfur and/or phosphorous atoms. Carbohydrates for use herein also include, but are not limited to, synthetic polymeric substances such as polydextrose and maltodextrin, and natural polymers such as, for example, guar gum, galactans, glucans and fucans. Carbohydrates for use herein may also comprise any natural or unnatural stereoisomer or mixtures of stereoisomers. Further, a carbohydrate for use herein may comprise the naturally occurring enantiomer, (e.g. D, or L), an unnatural stereoisomer, or a racemic mixture (e.g. D and L). In various embodiments, the at least one carbohydrate used in the method is a reducing sugar.

In various embodiments, a method for separating nut oil from nuts comprises grinding a mixture comprising: (i) at least one variety of nuts; and (ii) at least one monosaccharide, disaccharide, oligosaccharide, polysaccharide, or mixtures thereof, for a length of time sufficient to promote oil separation. In various aspects, the nuts are shelled nuts. In certain examples, the nuts are nut pieces rather than whole nuts.

Any monosaccharide having $C_3$-$C_7$ chain length finds use as the carbohydrate in the methods disclosed herein. Typical monosaccharides for use herein include, but are not limited to, D-glyceraldehyde, D-erythrose, D-threose, D-ribose, D- or L-arabinose, D-xylose, D-lyxose, D-allose, D-altrose, D-glucose, D-mannose, D-gulose, D-idose, D-galactose, D-talose, dihydroxyacetone, D-erythrulose, D-ribulose, D-xylulose, D-psicose, D-fructose, D-sorbose, D-tagatose, and mixtures thereof. In various embodiments, the at least one carbohydrate comprises at least one of D-fructose and D-glucose. In various embodiments, the at least one carbohydrate comprises D-fructose. Monosaccharides for use herein may also comprise a deoxygenated species (e.g. fucose, rhamnose, and the like), an oxidized species (e.g. uronic acid, glucuronic acid, galacturonic acid, mannuronic acid, and the like), or any reduced species, (e.g. the sugar alcohols erythritol, mannitol, xylitol, sorbitol, and the like).

Monosaccharides are classified as reducing sugars if capable of reducing ferric or cupric ions (i.e., Fehling's Reaction). In the methods disclosed herein, the at least one carbohydrate may comprise a monosaccharide that is a reducing sugar, such as for example, D-fructose or D-glucose. In other instances, the at least one carbohydrate used in the methods does not comprise a reducing sugar.

Also of use herein are any known natural or synthetic disaccharides, including, but not limited to, sucrose, lactulose, lactose, maltose and trehalose. A disaccharide for use in the present methods may be a reducing sugar (having a free anomeric carbon not involved in the glycosidic bond), or not (the anomeric carbon tied up in the glycosidic bond), or may cleave at least to some extent during the process into its monosaccharide components, one or both of which may be reducing sugars. In various embodiments, the at least one carbohydrate comprises sucrose.

In various embodiments of the present method, the carbohydrate comprises at least one disaccharide that remains a disaccharide throughout the nut oil separation process. In other embodiments, the at least one carbohydrate comprises a disaccharide that is at least partially hydrolyzed into its constituent monosaccharides during the nut oil separation method. In at least some instances, the at least one carbohydrate comprises sucrose, which may remain a disaccharide, or be partially to entirely hydrolyzed into invert sugar (equal mixture of D-glucose and D-fructose) during the nut oil separation method disclosed herein. Not wishing to be bound by any particular theory, fatty acids and/or enzymes present in the nuts may catalyze anywhere from a partial to a full hydrolysis of a disaccharide during the present method of nut oil separation.

In various embodiments of the present method, the carbohydrate comprises a natural or unnatural polysaccharide. Naturally occurring polysaccharides may be terrestrial or marine. Non-limiting examples of polysaccharides include guar gum (containing polysaccharides having a mannose backbone with galactose branches, referred to as galactomannan), locust bean gum (also galactomannan, but different galactose/mannose ratio than guar gum), glucans (polymers of glucose), fucans (sulfated polysaccharides), and the like. As with the disaccharides, polysaccharides may hydrolyze partially or fully in the method to provide mono-, di-, or oligomeric saccharides that may be responsible for promoting the oil separation.

Other carbohydrates that find use herein include compounds having at least one additional heteroatom besides oxygen. Such carbohydrates, include, but are not limited to, glucosamine, galactosamine, mannosamine, N-acetyl-β-D-glucosamine, D-glucose-6-phosphate, muramic acid, N-acetylmuramic acid, and the like.

For the oil separation methods disclosed herein, the total carbohydrate used is from about 5% to about 35% by weight, based on the total weight of the mixture of shelled nuts and carbohydrate. In calculating the amount of carbohydrate used in the methods, any carbohydrate that may be naturally present in a particular nut is not considered. Also in calculating the carbohydrate used in the present methods, the "total carbohydrate" added is considered, recognizing that "at least one carbohydrate" in the method includes using several sugars together as a mixture, (e.g. a mixture of fructose and glucose), or even a complex blend of sugars (e.g. as provided in honey, in a tree/plant syrup or in a fruit juice or whole fruit reduction obtained from fruit juice and/or fruit). In some instances, the total carbohydrate of a natural sugar source may be known, but not the precise amounts of the carbohydrate constituents. Certain fruit juice concentrates and whole fruit reductions may have total carbohydrate levels that can only be approximated without measurement. In some instances, a Brix Refractometer can be used to estimate sugar content of starting fruit and finished fruit reductions. In certain examples, solid carbohydrates may be dissolved in water to produce syrups useful in the system and method disclosed herein. For example, sucrose (i.e., ordinary table sugar, cane sugar) may be dissolved in a minimum amount of water to make a "simple syrup," such as a supersaturated concentrate. This simple syrup can then be used in the present system and method for nut oil separation, calculating the amount of syrup required based on a known total carbohydrate in the syrup. Syrups made in this way may simplify automated production systems based on the nut oil extraction methods disclosed herein, such as simplifying the addition of the carbohydrate in liquid form to large scale grinders.

In various embodiments, the carbohydrate used for the nut oil recovery methods herein comprises a fruit reduction. What is meant by a fruit reduction is the material obtained when fruit juice and/or whole fruit is concentrated for a time sufficient to remove essentially all the water and to produce a syrup, such as the syrup that may be used for jams and jelly or for dissert toppings. Such reductions may be high in fructose. In various aspects, a mixture of fruits and fruit juices may be boiled down or otherwise concentrated to produce the fruit reduction. For example, a mixture of cherries in orange juice may be boiled down to a fruit reduction usable in the nut oil recovery methods herein. The process of making a fruit reduction may also include a step of skinning, mashing, slicing and/or chopping fruit and/or a step of straining or freeze drying at any stage in the reduction process to remove water and to separate carbohydrate-rich liquid/syrup from solid/pulp materials. Fruit for fruit reductions include, but are not limited to, cherries, strawberries, blueberries, raspberries, blackberries, grapes, bananas, dates, figs, apples, peaches, pears, nectarines, plums, oranges, tangerines, grapefruit, melon, cantaloupe, mango, pomegranate, cranberries, pineapple, kiwi, and apricots. Any fruit having at least some sugar content may be reduced to a syrup usable as the carbohydrate source in the method, provided that substantially all the water can be evaporated and provided the resulting syrup can provide the necessary weight of carbohydrate according to the targeted nut/carbohydrate ratio and consideration of the batch size. Certain high-sugar vegetables, such as sugar beets, may also be cooked down to produce a carbohydrate mixture for use herein. In various examples, a single species of fruit may provide both the nut or seed and the fruit for the carbohydrate. For example, grapes may provide both the carbohydrate (from reduction of the grape skins, pulp and juice), and the nuts for oil recovery (i.e., the grape seeds for grapeseed oil recovery). In other examples, a whole fruit such as an apricot may provide a pit that can be shelled and used for nut oil recovery in the presence of a fruit reduction obtained from the apricot fruit pulp.

In various embodiments, the total carbohydrate used in the methods comprises about 5-35% by weight, 10-30% by weight, 15-25% by weight, 18-22% by weight, or about 20% by weight, based on the total weight of the shelled nuts and carbohydrate. In some cases, less carbohydrate results in more efficient oil separation and somewhat lower carbohydrate content nut dough. In a non-limiting example, 2-pounds of shelled nuts (i.e. 32 wt. ounces) may be ground together with from about 3.5 wt. ounces to about 13.7 wt. ounces of total carbohydrate for a length of time sufficient to promote nut oil separation from the nuts. Alternatively, 2-pounds of shelled nuts (i.e. 32 wt. ounces) may be ground together with from about 5.6 wt. ounces to about 10.7 wt. ounces of total carbohydrate for a length of time sufficient to promote nut oil separation from the nuts. Or, 2-pounds of shelled nuts (i.e. 32 wt. ounces) may be ground together with from about 7.0 wt. ounces to about 9.0 wt. ounces of total carbohydrate for a length of time sufficient to promote nut oil separation from the nuts. In another non-limiting example, a mixture comprising 2-pounds shelled nuts (i.e. 32 wt. ounces) and about 8.0 wt. ounces total carbohydrate is ground for a length of time sufficient to promote separation of nut oil from the nuts. There appears to be a lower limit as to how low the carbohydrate level can be and still achieve oil separation. For example, in some specific embodiments comprising the use of honey as the carbohydrate source, the lower limit for almond oil separation appears to be about 6 wt. ounces honey per 32 wt. ounces almonds, and the lower limit for pecan oil separation appears to be about 5.5 wt. ounces honey per 32 wt. ounces pecans.

The carbohydrate used in the method may comprise at least one of a monosaccharide, disaccharide, oligosaccharide or polysaccharide, at a total carbohydrate level of about 5-35% by weight, 10-30% by weight, 15-25% by weight, about 18-22% by weight, or about 20% by weight, based on the total weight of the shelled nuts and carbohydrate. The carbohydrate may comprise at least one of D-fructose, D-glucose, and sucrose, at a total carbohydrate level of about 10-30% by weight, 15-25% by weight, about 18-22% by weight, or about 20% by weight, based on the total weight of the shelled nuts and carbohydrate.

In these and other embodiments, the length of time sufficient to promote oil separation is: less than about 30 minutes; less than about 15 minutes; or less than about 10 minutes. In most instances, the length of time sufficient to promote oil separation is less than about 10 minutes and can even occur over the course of only several minutes.

In some examples, a method of separating pecan oil from pecans comprises grinding a mixture of shelled pecans and a total of 5-35% by weight, 10-30% by weight, 15-25% by weight, 18-22% by weight, or about 20% by weight of at least one of D-fructose, D-glucose, and sucrose, based on the total weight of the shelled nuts and carbohydrate, for a length of time sufficient to promote pecan oil separation. The length of time sufficient to promote oil separation is: less than about 30 minutes; less than about 15 minutes; or less than about 10 minutes.

In various embodiments of the present disclosure, it may be, for example, more convenient, cheaper, effective, faster, organic, or marketable, to provide the carbohydrate for the present method in a natural or unnatural composition, such as a honey or syrup. Any natural or unnatural material having a usable level of at least one desired carbohydrate may be used as the source of the at least one carbohydrate in the present method. The term "unnatural material" used herein in the context of carbohydrate source is meant to also include naturally occurring materials that have been synthetically manipulated into a non-naturally occurring material, such as naturally occurring sugars that are subsequently hydrogenated. Such natural and unnatural carbohydrate compositions for use herein include, but are not limited to, honey, corn syrup, high fructose corn syrup, maple syrup, agave syrup, birch syrup, cane syrup, simple syrup, molasses, brown rice syrup, glucose syrup, tapioca syrup, rice bran syrup, malt syrup, sorghum, guar gum, treacle, panela, carob syrup, hydrogenated high maltose-content glucose syrup, hydrogenated glucose syrup, fruit juice, fruit juice concentrate, wine, and any other fruit, plant, flower, or tree juice, nectar, sap, reduction, or syrup. It should be recognized that a natural composition, such as honey, plant syrup, or whole fruit or fruit juice reductions, amongst many others, will vary in carbohydrate composition for a number of reasons, including source, terroir, and method of processing (raw, filtered, unfiltered, cooking time, etc.), and in some cases, the composition may not be precisely known. Honey and agave syrup are convenient for use herein, are recognized as friendly on food labels, and are available as certified organic. Honey and agave syrup, amongst other carbohydrate sources, may also vary to some degree by brand/producer. Fruit for fruit reductions herein, such as dates, figs, cherries, pomegranate, bananas, and the like, will also experience variations in carbohydrate content due to species of fruit, terroir and method of processing to obtain the corresponding syrup.

Honey comprises around 82.4% by weight carbohydrate on average, when a number of indigenous species are averaged, the remainder being essentially water and a variety of nutrients. Floral honey in the United States was found to contain 38.2% fructose, 31.3% glucose, 7.1% maltose, 1.3% sucrose, and 1.5% higher sugars, totaling about 80% carbohydrate. Thus, in various embodiments of the present method, honey may be used as the source of the at least one carbohydrate in the method, and in doing so, mostly D-fructose, D-glucose and sucrose are brought to the method. In order to create mixtures of about 5-35% by weight, 10-30% by weight, about 15-25% by weight, about 18-22% by weight, and about 20% by weight total carbohydrate, based on the total weight of nuts and carbohydrate, one would use, respectively, about 6.25-43.75% by weight, 12.5-37.5% by weight, about 18.75-31.25% by weight, about 22.5-27.5% by weight, or about 25% by weight honey, based on the total weight of nuts and honey. In various examples comprising honey as the carbohydrate source, 6 wt. ounces honey per 32 wt. ounces of nuts may be used to promote oil separation, which depending on the species of nuts, may be the lowest amount of honey usable to promote oil separation. For conversion from this 6 wt. ounces honey/32 wt. ounces nuts "standard" ratio to other carbohydrate sources besides honey, the total sugar content of the carbohydrate being considered is noted and then the appropriate amount of that carbohydrate source is determined based on the total sugar load percentage equivocating to 6 wt. ounces honey level.

A cup of chopped fruit typically contains from about 4 grams (cranberries) to about 30 grams (figs) of sugar. Depending on the fruit, a cup of fruit may weigh from about 5 wt. ounces (sliced apples) to about 1-pound (mashed bananas). As mentioned, a Brix Refractometer or other suitable instrument can provide an estimate of the sugar level of the fruit prior to reduction into syrup, or after reduction into syrup. Of particular interest herein is the use of a pomegranate fruit reduction as the carbohydrate source in the method. 100 grams pomegranate arils contain about 13-14 grams of sugar, (i.e. about 13-14 wt. % total carbohydrate in pomegranate arils). The sugars are a mixture of fructose, glucose, sucrose and maltose. Thus the required weight of pomegranate arils can be calculated as in the honey examples above, except that the arils require mashing and concentration to produce an essentially water free pomegranate reduction (called "PomCon" herein for convenience) whereas honey can be used "as is" in the method. For example, 100 grams arils can be reduced to a fruit reduction containing about 13-14 grams sugar, which at 20 wt. % total carbohydrate in the method, would be sufficient carbohydrate to promote oil separation from 52 grams shelled nuts or seeds. In a more specific example, 1.74 Kg of pomegranate arils can be reduced to a PomCon syrup comprising 226 grams of sugar, which can be added with grinding to 32 wt. ounces (907 grams) shelled almonds to promote almond oil separation. In other examples, 32 wt. ounces shelled almonds are ground with 18 wt. % PomCon to promote almond oil recovery from the almonds. In this latter example, 18 wt. % total PomCon in the method is equivalent to using about 7 wt. ounces PomCon with 32 wt. ounces shelled almonds. In variations of the PomCon/almond examples, the almond oil separated may take on certain characteristics of the pomegranate fruit, such as its red color. Further, the dandy resulting from the use of PomCon as the carbohydrate source may take on various flavor and/or color attributes of the pomegranate fruit.

In various embodiments, a method of separating nut oil from nuts comprises grinding a mixture of shelled nuts and about 12.5-37.5% by weight, about 18.75-31.25% by weight, about 22.5-27.5% by weight, or about 25% by weight honey, based on the total weight of the shelled nuts and the honey, for a length of time sufficient to promote separation of nut oil from the shelled nuts. For example, a method of separating pecan oil from pecans comprises grinding a mixture of shelled pecans and about 22.5-27.5% by weight honey, based on the total weight of the shelled pecans and the honey, for a length of time sufficient to promote separation of pecan oil from the shelled pecans. In various aspects of separating pecan oil from shelled pecans, the length of time comprises less than about 10 minutes.

Additionally, agave syrup finds use in the methods of the present disclosure. Some agave sweeteners comprise about 76% carbohydrate, with up to about 90% of it being D-fructose, the remainder, D-glucose. Thus, although agave syrup has similar total carbohydrate levels compared to honey, the amount of D-fructose is substantially higher. Agave syrup, like honey, is available as certified organic, and thus compatible with the separation of organic nut oil from organically grown nuts. In order to create mixtures of about 10-30% by weight, about 15-25% by weight, about 18-22% by weight, and about 20% by weight total carbohydrate, based on the total weight of nuts and carbohydrate, one would use, respectively, about 13-40% by weight, about 20-33% by weight, about 24-29% by weight, or about 26% by weight agave syrup, based on the total weight of nuts and agave syrup.

Additionally, maple syrup may find use in the methods of the present disclosure. Maple syrup is derived from the sap of various species of maple tree and provides about 67 wt. % total carbohydrate based on the weight of the syrup. Maple syrup is believed to consist primarily of sucrose and water, with much lesser amounts of invert sugar (equal mixture of glucose and fructose) present from hydrolysis of sucrose during boiling of the syrup. As shown herein above for honey and agave syrup, the amount of maple syrup for separating nut oil from nuts can be calculated in order to provide about 10-30% by weight, about 15-25% by weight, about 18-22% by weight, and about 20% by weight total carbohydrate, based on the total weight of nuts and carbohydrate, factoring in that maple syrup provides about 67 wt. % carbohydrate.

Grinding

In various aspects of the method, any human driven, animal driven, motor driven, or otherwise driven tool, grinder, or mill may be used to facilitate oil separation. For example, a food mill, such as a colloid mill or any type of mortar and pestle, or motorized stone grinder may be used. The term "grinding" as used herein is meant to refer generally to a shearing force on the nuts, seeds or legumes, and is not meant to be tied particularly to a "grinder" as the tool for this purpose. In other words, the action of "grinding" may be carried out in a mortar and pestle (e.g. hand or animal driven), a motorized colloid mill, a chopper, a food processor, a blender, a disc mill (e.g. ABC Hansen Universal Mill), a motorized stone melanger tool, a mixer, or any other homemade, rudimentary, unique or common, retail or commercially available tools and/or machinery. In some instances, a tool may be immersed into the nuts. In other examples, a nut grinder, such as an Olde Tyme Nut Grinder available from Pleasant Hill Grain, Hampton, Nebr., may be used as a "first pass" for the nuts, whereby the material from the grinder, usually a smooth butter, is then transferred to another apparatus for grinding in the presence of carbohydrate. The process of grinding nuts may be between two movable members arranged in close proximity to one another or touching one another, or between a movable and stationary member in close proximity to one another or touching one another, or simply from the action of a moving member striking the nuts (e.g., in the case of a rotating propeller immersed into a vessel of nuts).

In various embodiments, a melanger may be used in the nut oil recovery method disclosed herein. Although the word "melanger" is French for "mix," the noun "melanger" is used herein to refer to a stone grinding machine. The term "melangering" is used as a verb to mean grinding materials in a melanger. A melanger is, in certain respects, a motor-driven mortar and pestle, with the motor replacing the manual labor necessary to keep the mortar in motion and to force it against the pestle while in motion. Certain melangers feature granite roller stones that rotate over a granite base positioned in the bottom of a bowl or drum, where the force of the roller stones against the stone base may be adjustable, (e.g. sometimes referred to as the "tension" or "tensioning"). For example, increasing tension in a melanger increases shearing of material between the stone rollers and the stone base because of an increase in force of the stone rollers against the base. Decreasing tension decreases the force and the shearing. Melangers may have other features too, such as for example, scraping paddles that make the grinding process faster and more efficient by scraping material from the wall of the bowl and pushing it down to the base of the bowl for continued grinding. Melangers are traditionally associated with food processing whereby a food substance is ground and further blended into a creamy consistency. The most recognizable uses for a melanger include cocoa processing to make chocolate, and various nut processing to make nut butter (most notably, peanut butter). For example, cocoa nibs may be ground into chocolate and peanuts ground into peanut butter. Besides chocolate and nut butter processing, melangers also find use in making masa, coconut paste, tahini, humus and other foods. Melangers also find use in the manufacture of certain cosmetics and nutraceuticals.

In various embodiments or the present nut oil separation method, any combination of machines and processes may be used for the step of grinding. For example, shelled nuts may be pre-ground in any type of pre-grinder or mill, and then the granulated nut material or nut butter transferred to a melanger or a colloid mill, for example, for nut oil separation. Or in other embodiments, a single tool is used wherein, for example, the pre-grinding of shelled nuts may be conducted in a stone melanger and then at least one carbohydrate added into that stone melanger while the grinding is continued.

Various stone melangers are available from Spectra (763 Avinashi Rd, Coimbatore 641004, India, www.spectraplaza.com). The Spectra melangers range in size and features, some having variable speed motors and tensioning controllers. A smaller melanger is the Spectra 11 melanger, having an 8 liter drum capacity, a pair of 1.5 Kg granite roller stones measuring 6 cm width×11 cm diameter, a rubber belt drive and a 1/6 HP electric motor. The largest melanger from Spectra is the Spectra 100-C melanger having a 75 liter capacity, a chain drive, and a 2 HP electric motor.

General Methods

Generally, shelled nuts are pre-ground for a certain length or time or to a certain visual consistency or to a target viscosity, and then at least one carbohydrate is added with further grinding for a length of time sufficient to promote nut oil separation. As mentioned, all of the grinding, (e.g. the pre-grinding without carbohydrate and the subsequent grinding in the presence of at least one carbohydrate), may be conducted in the same tool or machine, or alternatively, in different tools or machines. For example, a nut grower may shell, optionally chop, roast and/or pre-grind the nuts, and then ship this chopped, granulated nut material or nut butter to a third party for the actual nut oil separation. For example, a grower or other party may melanger nuts to a particular consistency and then ship the material (such as in the form of nut butter) to another party/facility that recovers the oil from the material. As mentioned, nut pieces are a suitable starting material, and provide a lower cost option to whole nuts.

A method of separating nut oil from nuts comprises grinding a mixture of at least one variety of nut and at least one carbohydrate for a length of time sufficient to promote nut oil separation. The method may further include at least one of shelling the nuts, pre-grinding the nuts, roasting the nuts, seasoning the nuts, and flavoring the nuts.

In non-limiting examples, the nut for use herein may be selected from the group consisting of almonds, pecans, walnuts, cashews, pistachios, peanuts, kola nuts, palm nuts, hazelnuts, filberts, Brazil nuts, macadamia nuts, and chestnuts. In non-limiting examples, seeds may be selected from the group consisting of sunflower seeds, safflower seeds, pumpkin seeds, rapeseeds, flaxseeds, grape seeds, sesame seeds, cotton seeds, and linseed. In a non-limiting example, soybeans may be used in the methods herein to provide soybean oil. In any of these examples, the nuts, seeds or legumes may include any known species of any genus, and any mixtures thereof.

The carbohydrate is selected from the group consisting of natural and unnatural monosaccharides, natural and unnatural disaccharides, natural and unnatural oligosaccharides, and natural and unnatural polysaccharides, and mixtures thereof. In various embodiments, the carbohydrate is preferably selected from at least one of D-fructose, D-glucose, and sucrose.

Although carbohydrate selection for promoting oil separation is somewhat empirical, it appears as if monosaccharide reducing sugars work quite well. Examples include D-fructose and D-glucose. In some experiments, honey and agave syrup, both known to contain large amounts of D-fructose, work well at promoting nut oil separation according to the present methods. Further, fruit reductions, also known to be high in D-fructose, also efficiently promote nut oil and seed oil separation. Thus in various embodiments, the at least one carbohydrate comprises D-fructose, and the source of the D-fructose may be honey, agave syrup, various fruit reductions, and mixtures thereof.

The at least one carbohydrate is present at about 5-35% by weight, 10-30% by weight, about 15-25% by weight, about 18-22% by weight, or about 20% by weight, based on the total weight of nuts, seeds or legumes and carbohydrate.

The weight of starting material for the present method (regardless if the process is batch or continuous) may be from gram quantities to many hundreds or even thousands of kilos of nuts, seeds or legumes and carbohydrate, depending on the size of the systems available.

In various embodiments, a method of separating nut oil from shelled nuts comprises: grinding at least one variety of shelled nuts into fine particulate nut meats or nut butter; producing a mixture of at least one carbohydrate and said fine particulate nut meats or nut butter by adding a source of at least one carbohydrate to said fine particulate nut meats or nut butter; grinding said mixture for a length of time sufficient to promote nut oil separation from defatted nut dough; and removing the separated nut oil from the defatted nut dough. In various embodiments, the shelled nuts are optionally roasted prior to grinding into coarse to fine granulate or nut butter. In various embodiments, the grinding into fine particulate nut meats or nut butter (in the absence of carbohydrate) is continued until a viscosity target is reached.

In various embodiments, grinding shelled nuts or shelled nut pieces in the absence of carbohydrate for less than about 1-hour, or less than about 30-minutes, sufficiently converts most shelled whole nuts or shelled nut pieces into a fine granulated nut meat or nut butter depending on the nut species. Frequently this intermediate nut material has a creamy nut butter consistency with particulates barely discernable by the naked eye or not discernable at all without magnification. In some instances, grinding shelled nuts or shelled nut pieces for about 20 minutes in a stone melanger in the absence of any carbohydrate results in some localized heating of the nut material, such as, for example, an increase in temperature of the material of about 1° F. to about 50° F. Thus, the temperature of the nut material in this initial grinding in the absence of carbohydrate may reach as high as 90° F. to about 125° F. Since this observed localized heating occurs in the absence of added carbohydrate, it is assumed to be created by the friction in the grinding/shearing of the nuts, rather than from any exothermic chemical reactions.

In various embodiments, shelled nuts or shelled nut pieces are ground in the absence of carbohydrate until the nut material converts to a creamy nut butter and reaches a target viscosity of from about 3,000 to about 5,000 cps at a temperature of from about 88° F. to about 93° F. (when measured on a TA Instruments AR-G2 Rheometer with Parallel Plate Geometry, with a shear rate of 50 1/sec.). As discussed, grinding may comprise melangering nut material in a stone melanger. Also, this initial grinding in the absence of carbohydrate may be continued until a particular appearance is reached (e.g. a "creamy" nut butter consistency) and/or until a particular viscosity is reached (e.g. from about 3,000 to about 5,000 cps at 88° F. to about 93° F., on a TA Instruments AR-G2 Rheometer with Parallel Plate Geometry, with a shear rate of 50 1/sec), or even until a targeted internal temperature is reached (e.g. from about 88° F. to about 93° F.). In some examples, initial grinding in the absence of carbohydrate is in accordance to a set length of time, such as from about 30 min to about 60 min.

In other aspects, a method of separating nut oil from nuts comprises: grinding a mixture of at least one variety of nut and at least one carbohydrate for a length of time sufficient to promote nut oil separation, wherein said mixture has a w/w ratio of from about 9:1 to about 7:3 (nut to carbohydrate), said method provides from about 25% to about 80% nut oil yield based on the theoretical amount of oil present in said nuts, and wherein said method does not use any hydrocarbon or $CO_2$.

The present disclosure also provides for a non-extraction and non-extrusion method of separating nut oil comprising grinding a mixture of at least one variety of nut and at least one carbohydrate for a length of time sufficient to promote nut oil separation. In various embodiments, the mixture comprises a w/w ratio of nut to carbohydrate of from about 9:1 to about 7:3. In various aspects, the yield of nut oil is from about 25% to about 80%, based on the theoretical amount present in the nuts. In some cases, yield is >50%, >60%, >70% or about 78%. "Non-extraction" means no use of hexane or any other hydrocarbon extraction solvent or any use of $CO_2$ or any other super critical fluid extraction. Further, "non-extrusion" means that the method does not involve mechanical pressing operations, such as cold-pressing or expeller pressing, or any other method of physically forcing oil from nuts.

Referring now to FIG. 1, an embodiment of a method 100 of separating nut oil from nuts is disclosed. The method 100 comprises optional pre-grinding and/or roasting of shelled nuts at step 110. As discussed, nuts may comprise nut pieces rather than whole nuts, and may be roasted, seasoned or flavored at this step or at any of the later steps. The shelled and optionally chopped, ground and/or roasted material then is ground further in step 120 to produce a nut butter of creamy consistency, optionally comprising very fine particulate nut material. The appearance of the butter produced during step 120 depends at least on the variety of nuts used in the method. Some nuts are easily blended into butter during grinding in a stone melanger in less than about 30 minutes, whereas some other nuts may never convert to a creamy consistency during any length of time grinding. During step 120, shelled nut pieces or pre-ground nut material from step 110 is ground for less than about 30-minutes or until the nuts break completely down into particulate nut meat material and blend into butter. In typical examples, nuts are ground prior to carbohydrate addition for a time sufficient to produce a creamy nut butter. Ideally the nut butter should have a viscosity of from about 3,000 cps to about 5,000 cps when measured at a temperature of from about 88° F. to about 93° F. (on a TA Instruments AR-G2 Rheometer with Parallel Plate Geometry, with a shear rate of 50 1/sec). The temperature at which the viscosity measurement is made is the internal temperature of the nut butter at this stage in the process. For example, during step 120, shelled nuts are melangered for about 25 min to about 35 min until the internal temperature of the nut material reaches about 91° F. and the material becomes a creamy nut butter having a viscosity of 3,930 cps at 91° F. (measured on a TA Instruments AR-G2 Rheometer with Parallel Plate Geometry, with a shear rate of 50 1/sec, using a 4 wt. ounce sample). For some nuts, the grinding for about 30-60 minutes, for less than about 30 minutes, or from about 25-35 minutes will produce butter, such as smooth, creamy textured material. For other nuts, grinding for about 30-60 minutes, for less than about 30 minutes, or from about 25-35 minutes will convert shelled nuts or shelled nut pieces into fine particulate nut meats having at least some resemblance to nut butter.

Thus as indicated in FIG. 1, the grinding step 120 may be conducted: (i) for a time sufficient to produce a creamy nut butter; (ii) for a set time period; (iii) for a time sufficient to reach an internal temperature target; and/or (iv) for a time sufficient to reach a viscosity target. The nut butter resulting from step 120 is then used in the step of grinding in the presence of at least one carbohydrate, discussed below.

With continued reference to FIG. 1, step 130 comprises the addition of at least one carbohydrate to the nut butter and the additional grinding for a length of time sufficient to promote oil separation, such as, for example, less than about 30 minutes, less than about 15 minutes, or less than about 10 minutes. The "signal" that carbohydrate should now be added to the nut material may be based on appearance, time, temperature, and/or viscosity (i.e., signally to the operator when to end step 120 and move to step 130). As mentioned, steps 110, 120 and 130 need not be conducted in the same grinding apparatus, on the same day or even at the same physical location. For example, nut butter obtained in step 120 may be transferred to another location altogether to be ground further in the presence of at least one carbohydrate for a length of time sufficient to promote oil separation.

Step 140 of method 100 comprises the oil separation from the nuts. The grinding step 130 in the presence of carbohydrate induces the oil separation, while step 140 is the physical removal of the oil from the defatted nut dough, such as by, for example, by simple draining or decanting, or by suctioning the oil off from the top of the separated material.

Commercially Useful Nut Oils

After filtering to remove high protein/fat particulate matter, nut oil separated from nuts in accordance to the methods disclosed herein may have composition, nutritional analysis, and/or taste substantially identical to cold pressed oil obtained from the same nuts. However, nut oil separated in accordance with the present method may be more easily certifiable as "organic," such as when using organically grown nuts and an organic source of carbohydrate, (e.g., honey certified as organic, or organically grown fruits), which may make the oil more marketable. In other examples, e.g., when using a fruit juice and/or whole fruit reduction as the carbohydrate source, the nut or seed oil separated from nuts or seeds by the present methods may taste and/or look different than cold-pressed oil from the same nuts or seeds. As a non-limiting example, almond oil obtained from melangering almonds with a cherry reduction or with a pomegranate aril reduction (PomCon) as the carbohydrate source results in a red-colored almond oil. In other examples, the use of highly colored beets as the carbohydrate source can impart a color to the separated oil.

As shown in the comparative study of pecan oils below, pecan oil separation in a honey melangering process directly produces a pecan nut oil that is somewhat nutritionally and compositionally different than expeller pressed 100% virgin pecan oil. This difference is due to the presence of a small amount of particulates that are high in protein and fat. Filtration, e.g. micro filtration, of the oil results in pecan oil that is substantially identical to the expeller pressed 100% virgin pecan oil shown in the table.

In various examples, mixtures of nuts (e.g. cashews and pecans together, or almonds, pecans and pistachios together) provide nut oil having unusual flavors that may not be obtained by cold-pressing a mixture of the same nuts or by blending single nut cold-pressed nut oils together. Further, the process of first mixing the shelled nuts and then grinding in the presence of at least one carbohydrate may be simpler than these alternative ways of obtaining mixed oils.

In variations of the present method, food ingredients may be added to the process, and at least a portion of these ingredients, such as the associated flavors and/or colors, end up in the nut oil and/or in the defatted nut dough co-product. For example, chocolate can be added to the pecan oil separation process resulting in uniquely chocolate flavored pecan oil. This variation with chocolate also produces uniquely chocolate flavored defatted nut dough (the "dandy"). In various aspects, chocolate is added into the melagerer and worked into the nut meat prior to addition of the honey or other carbohydrate, such that when the nut oil separates, the chocolate is rendered into the nut oil and into the nut meat co-products. As mentioned, the addition of fruit reductions as the carbohydrate source can result in oil having taste and/or color characteristics of the fruit.

Similarly, many other food ingredients and combinations thereof, besides just chocolate, may be added to the melangerer to produce flavored nut oil and flavored nut meat co-products. Such food ingredients include, but are not limited to, lavender, sage, oregano, tarragon, and any other herbs, garlic, onion, paprika, pepper and any other spices.

Defatted Nut Dough

As mentioned, separation of nut oil from nuts in accordance with the present system and method results in a by-product referred to as "nut dough" or "defatted nut dough" (or colloquially called, "dandy"). This material is defatted nut meat, which is correspondingly high in protein. "Defatted," as the term is used herein, is not meant to convey a complete absence of oils. Certainly in the instances where less than 100% nut oil is recovered in the process, the remaining dandy will contain at least some fat, and in some cases, a fair amount of fat if the percent yield of oil was only moderate. A sample of defatted nut dough obtained from the methods herein was nutritionally and compositionally analyzed, and the results set forth in TABLE 1. In the table, a comparison is made between raw pecans, pecan dandy obtained from the present honey melangering method, pecan butter, and raw pistachio nuts. As shown, 60 grams of raw whole pecans has 5.4 grams of protein while 60 grams of pecan dandy (at 6 wt. oz. honey per 32 wt. oz. nuts in the separation method) yields 13 grams of protein. The dandy co-product resulting from the present methods finds valuable use as a snack food, as an ingredient in snack foods, and as the starting material for nut milk production.

TABLE 1

Nutritional Comparison Grid

| Serving Size: 60 g | Nutritional Comparison | | | | |
|---|---|---|---|---|---|
| | Raw Pecans | 6 oz. Dandy | 10 oz. Dandy | Pecan Butter | Raw Pistachio |
| Calories (Kcal) | 414.60 | 230.00 | 300.00 | 416.65 | 334.20 |
| Total Fat | 43.20 | 6.00 | 13.50 | 43.33 | 26.40 |
| Saturated Fat | 3.60 | 1.00 | 2.25 | 3.33 | 3.00 |
| Sodium | | 0.00 | 0.00 | 0.00 | |
| Total Carbohydrate | 8.40 | 32.00 | 34.50 | 8.33 | 16.80 |
| Dietary Fiber | 6.00 | 9.00 | 12.00 | 5.00 | 6.00 |
| Total Sugars | | 15.00 | 15.00 | 1.67 | |
| Protein | 5.40 | 13.00 | 10.50 | 5.00 | 12.60 |
| Iron (mg) | | 4.00 | 0.15 | 0.08 | |
| Potassium (mg) | | 245.00 | | | |

Sources:

1.) Pecan Butter: Purely Pecans, https://purelypecans.com/product/pecan-butter/

2.) Raw Pistachio and Pecan from Agriculture Research Service. USDA Nutrient Database for Standard References. United States Department of Agriculture, Beltsville, Md., USA; 2001.

3.) 6 oz. and 10 oz. dandy from RL Food Testing Laboratories, Newbury Park, Calif., June 2017 (6 oz.) and July 2017 (10 oz.).

In various embodiments, the methods herein produce a defatted nut dough having a total fat content of from about 10% by weight to about 30% by weight, based on the total weight of the defatted nut dough co-product. Defatted nut dough in accordance to the present methods also comprises from about 15% to about 30% sugars (reported as sucrose). The carbohydrate used to promote oil separation in accordance to the present disclosure ends up in the defatted nut dough, perhaps complexed to proteins, and not in the separated nut oil.

It's important to note that the level of total fats in the defatted nut dough produced by the present methods is typically greater than the total fat remaining in the nut co-product obtained from either expeller pressing or solvent extracting of nut oils. These conventional oil extraction methods result in a co-product that is essentially completely defatted, (i.e. close to fat free), having little commercial value other than for milling into nut flour. The present process yields a nut dough having some fat, and this co-product finds use in foods and use in the production of nut milk.

Furthermore, expeller pressing of nuts leaves behind a nut dough that is structurally degraded. More specifically, proteins are denatured by the physical process of expeller pressing, and fibrous materials in the nut meats are all but destroyed. On the other hand, the defatted nut dough (dandy) produced by the present methods retains substantially intact nut proteins (little loss of tertiary structure or other denaturing) and intact structural fibers, and thus finds a wider variety of uses.

Defatted nut dough derived from the systems and methods herein may be subsequently subjected to at least one of grinding, milling, shaping, extruding, baking, frying, reconstituting, and chopping, in order to convert it to a desired form. Extrusion of the dandy may facilitate further oil removal to arrive at lower fat and higher protein dandy. In some cases the dandy may be used "as is" for a high-protein snack, such as with minimal baking, cutting, shaping and packaging. For example, dandy as derived herein comprises a nutritional snack source product to be used in combination with other products (e.g. chocolate) or as a stand-alone healthy snack product. When certified organic honey and organically grown nuts are used in the methods herein, the dandy is a slightly sweet, nutty and highly flavorful product. The composition of dandy derived from honey promoted nut oil separation is expected to have composition essentially that of honey and nuts, less the amount of fat separated out in the process. Purchasers of this product would be, for example, candy and health snack manufacturers. In some examples, substantially defatted nut dough is baked and chopped to produce what resembles chopped nuts. These defatted "nuts" may then be incorporated into any food product, such as, for example, baked goods or energy snack bars. In other instances, the defatted nut dough is dried and then milled into nut flour.

In various embodiments, defatted nut dough obtained from the nut oil recovery methods herein is usable for nut milk production. Typically nut milk, such as almond milk, is produced by blending nuts with water and then separating the nut solids from the liquid. Alternatively, nut milk can be made by adding water to nut butter. However, these processes are problematic due to the presence of the oil in the nuts. On the other hand, the defatted nut dough as provided herein is more convenient for nut milk production because a portion of the fat has already been removed from the nuts by the nut oil separation method. In general, the dandy left behind after the nut oil recovery methods disclosed herein can be blended with water in a suitable blender or grinder, and then filtered to produce nut milk, without additional steps of separating oil from the nut milk.

Systems for Separating Nut Oil from Nuts

A system for separating nut oil from shelled nuts comprises: a source of shelled nuts; a source of at least one carbohydrate; a grinding unit in communication with said sources to receive said shelled nuts and said at least one carbohydrate, said grinding unit comprising at least one movable member; optionally a stationary member; and a vessel; and an outlet for removing the separated nut oil. Variations of this system are used to carry out the oil separation method disclosed herein above.

FIG. 2 illustrates (in cross-section) an embodiment of a system 200 for nut oil separation in accordance to the present disclosure. The depiction in FIG. 2 is only an embodiment, and is not meant to limit the present system to any particular configuration or physical dimensions. System 200 comprises a source of shelled nuts 240, such as a hopper, chute or other appropriately configured apparatus for adding dry material. In a simple example, the source of shelled nuts 240 may comprise a scoop operated by hand. The source 240 may include weighing or other measuring capability and/or a mechanically operated closing means, such as a door or flap, to close off entry of the nuts. Although "shelled nuts" are indicated as being added to the system in FIG. 2, the nut material may have been chopped or pre-ground (to coarse or fine particulate or ground into nut butter) and/or roasted prior to addition to the vessel 210.

System 200 also comprises a source for at least one carbohydrate 245. Depending on the physical form of the at least one carbohydrate, the source 245 may be configured as a liquid inlet tube, a spray nozzle, or a dry hopper or chute, or some other appropriate apparatus for adding carbohydrate to the vessel 210. For example, source 245 may be a tube with the appropriately dimensioned inside diameter (ID) for conveying a liquid, e.g. honey or agave syrup. The carbohydrate source 245 may also be heated, such as to reduce the viscosity of the carbohydrate and aid its addition. The sources 240 and 245 are designed to add ingredients into the vessel 210, the additions being simultaneous or staggered in time. For example, if the nut material has already been pre-ground, such as into butter, the nut butter and the carbohydrate may be added at approximately the same time to the vessel 210. However, if shelled whole nuts or nut pieces are used, then the source of shelled nuts 240 may be activated first, with addition to the vessel 210, then a period of grinding without carbohydrate, then the addition of at least one carbohydrate through the source of carbohydrate 245.

With continued reference to FIG. 2, the system 200 further comprises a grinding unit comprising at least one movable member 220, optionally a stationary member 230, and a vessel 210 in communication with both the nut source and the carbohydrate source. The movable member 220 is shown as a pair of members, and may comprise a pair of stone rollers, discs, blades, and the like. Any number of movable members 220 may be appropriate, such as only one or a plurality, depending for example on whether the grinding unit comprises a disc mill, colloid mill, hammer grinder, or stone melanger. Optional stationary member 230 is shown as a plate positioned at the bottom of the vessel 210, and it may comprise a stone plate. In other variations, the stationary member 230 is not part of the vessel 210 and instead is associated more intimately with the movable member 220 (such as in a mill). In some cases, two movable members 220 suspended in the vessel 210 may grind against one another, and no stationary member is required. In various embodiments, the vessel 210 may be less than 1-liter in volume or as large as 10,000 liters or more depending on the particular operation. In various embodiments, the grinding unit is designed such that the movable member 220 is forced and moved against the stationary member 230, catching and shearing material caught between them. In some instances, movable member 220 and optional stationary member 230 in combination comprise a mortar and pestle, respectively, and in which case, the grinding unit may be a hand operated mortar and pestle, a stone melanger tool, or some other variation thereof. In other instances, the movable member 220 and stationary member 230 are parts to a disc mill. Also, as mentioned, two movable members 220 may grind together in the absence of any stationary member 230.

The grinding unit may further comprise a rotating shaft 225 configured to move the movable member(s) 220 and optionally to force the movable member(s) 220 against the stationary member 230. In various embodiments, the optional shaft 225 may be turned by a motor to any speed necessary to cause grinding by the grinding unit. In various embodiments, the system 200 may include movable paddles or other apparatus to wipe the insides of the vessel and push material toward the movable member 220. In some instances the force of a movable member 220 against a stationary member 230, or the force of two movable members 220 against one another, is adjustable, and may in some instances be referred to as the "tension."

Still with reference to FIG. 2, system 200 may further comprise an optional outlet 270a (or shown in an alternate position as outlet 270b) for recovering the separated nut oil. This optional outlet may of course be a simple drain, a spigot, a siphon or any other conceivable apparatus for getting the separated oil out of the grinding unit such that it can be packaged and sold. Two exemplary and non-limiting positions of optional outlet 270 are shown, and the choice may be made based on whether separated oil 280 can be drained from below or if separated oil 280 can be drained, siphoned or sucked off the top of the material in the vessel. In various embodiments, the outlet 270a (or shown in an alternate position as outlet 270b) may further comprise a suction apparatus, heater, and/or a valve to accelerate and control removal of the separated oil 280 from the remaining nut material 290. The two products resulting from the oil separation method of the present disclosure are the nut oil 280 and the defatted nut dough 290.

Use of the system 200 comprises: (i) providing a source of shelled nuts; directing said shelled nuts into a grinding unit comprising at least one movable member, a stationary member and a vessel, wherein the grinding unit converts the shelled nuts into coarse or fine particulate nut meats or butter; providing a source of at least one carbohydrate; directing said at least one carbohydrate into said grinding unit, wherein the grinding unit grinds together the coarse or fine particulate nut meats or butter with the at least one carbohydrate for a length of time sufficient to promote nut oil separation from the coarse or fine particulate nut meats or butter; and removing said separated oil through an outlet from said vessel.

A system for separating nut oil may provide for continuous nut oil separation rather than nut oil separation in batches, such as disclosed herein above. For example, in an exemplary continuous system, nuts may move down a conveyor to a grinding section, and then after grinding, moved down the line to where the nut material encounters, or is mixed with, carbohydrate. For example, ground nuts or nut butter may be conveyed underneath sprayers where honey or other liquid source of carbohydrate is sprayed onto the nut material. For nut butter, a screw may be used to fold in liquid, powdered or crystalline forms of carbohydrate into the butter, and the nut/carbohydrate mixture conveyed to an in-line grinder wherein the mixture is ground for a length of time sufficient to promote nut oil separation. For large batch operations, melangers may be adapted to any size, such as custom built for commercial use.

Examples of Nut Oil Separation

The following examples illustrate embodiments of the nut oil separation method in accordance with the present disclosure. In the examples exemplifying the use of honey, the honey used was "True Love Honey Mesquite," "True Love Honey Desert Blend," or "True Love Honey Orange Blossom," obtained from Holly Little Farm, (Marana, Ariz.). These are desert honeys that, although visibly turbid, are not raw honeys. "Mesquite," "Orange Blossom," and "Desert Blend" honey were interchangeable, giving substantially similar results in nut oil separation trials. Additionally, generic grocery and price club store brands gave similar nut oil separation results. Agave syrup, granulated sugar and various fruits were purchased from local grocery stores.

Example 1: Pecans/Honey Melangering

To the bowl of a running Spectra 11 stone melanger, with the tensioning knob turned 4-turns counterclockwise, was added 2 Pounds (32 wt. ounces) shelled pecans over the course of about 1 minute. The pecans were reduced from pieces to a granular consistency and then ultimately to a creamy nut butter consistency after about 20 minutes of continuous grinding in the melanger. With continued grinding, 10 wt. ounces of Desert Blend honey was introduced over the course of about 2 minutes. At this point, the tensioning of the melanger was increased to 5-turns clockwise. The increased tension appeared to help force the honey into the pecan butter. After about 4 minutes of continued grinding after the honey introduction, the pecan oil began to separate and the pecan dough began to thicken. Once pecan oil appeared, the tensioning of the melanger was reduced to 6-turns counterclockwise on the tensioning knob. The separated pecan oil was poured off from the pecan dough. Yield: 13.9 wt. ounces pecan oil; 24.3 wt. ounces defatted pecan dough. The theoretical yield of pecan oil from 32 wt. ounces of nuts is 20.8 wt. ounces, assuming a 65 wt. % oil content in pecans. Thus the actual yield was (13.9/20.8)× 100%=66.8% yield. The combined oil plus dough recovery (13.9 wt. ounces+24.3 wt. ounces=38.2 wt. ounces) represented a wastage of 3.8 wt. ounces.

Example 2: Pecans/Honey Melangering

The process described in Example 1 was repeated using 32 wt. ounces shelled pecans and 11.2 wt. ounces Desert Blend honey in the Spectra 11 stone melanger. Yield: 11.6 wt. ounces pecan oil; 17.6 wt. ounces defatted pecan dough.

The theoretical yield of pecan oil from 32 wt. ounces of nuts is 20.8 wt. ounces, assuming a 65 wt. % oil content in pecans. Thus the actual yield was (11.6/20.8)×100%=55.8% yield. The combined oil plus dough recovery (11.6 wt. ounces+17.6 wt. ounces=29.2 wt. ounces) represented a wastage of 14 wt. ounces.

Example 3: Pecans/Honey Melangering

The process described in Example 1 was repeated using 32 wt. ounces shelled pecans and 10 wt. ounces Desert Blend honey in the Spectra 11 stone melanger. Yield: 14.3 wt. ounces pecan oil; 24 wt. ounces defatted pecan dough. The theoretical yield of pecan oil from 32 wt. ounces of nuts is 20.8 wt. ounces, assuming a 65 wt. % oil content in pecans. Thus the actual yield was (14.3/20.8)×100%=68.75% yield. The combined oil plus dough recovery (14.3 wt. ounces+24 wt. ounces=38.3 wt. ounces) represented a wastage of 3.7 wt. ounces.

Example 4: Pecans/Honey Melangering

The process described in Example 1 was repeated using 32 wt. ounces shelled pecans and 9.9 wt. ounces Desert Blend honey in the Spectra 11 stone melanger. Yield: 13.9 wt. ounces pecan oil; 24.3 wt. ounces defatted pecan dough. The theoretical yield of pecan oil from 32 wt. ounces of nuts is 20.8 wt. ounces, assuming a 65 wt. % oil content in pecans. Thus the actual yield was (13.9/20.8)×100%=66.8% yield. The combined oil plus dough recovery (13.9 wt. ounces+24.3 wt. ounces=38.2 wt. ounces) represented a wastage of 3.7 wt. ounces.

Example 5: Almonds/Honey Melangering

In a variation of Example 1, 27.2 wt. ounces shelled almonds was introduced to the bowl of a Spectra 11 stone melanger over the course of about 25 minutes while the melanger was running. After about 6 minutes additional grinding of the almonds after complete addition, about 8.3 wt. ounces honey was added over the course of about 4 minutes to the ground nut material with grinding in the stone melanger uninterrupted. After about 7 minutes continued grinding after completion of the honey addition, almond oil began to separate from the nut dough. After about 2 minutes continuous grinding, nut oil separation was complete. Yield: 4.3 wt. ounces almond oil; 26.3 wt. ounces defatted almond dough. The theoretical yield of almond oil from 27.2 wt. ounces almonds is 14.14 wt. ounces, assuming a 52 wt. % oil content in almonds. Thus, the actual yield was (4.3/14.14)×100%=30.4%. The combined oil plus dough recovery (4.3 wt. ounces+26.3 wt. ounces=30.6 wt. ounces) represented a wastage of 4.9 wt. ounces.

Example 6: Almonds/Honey Melangering

In a variation of Example 1, 32 wt. ounces shelled almonds was introduced to the bowl of a Spectra 11 stone melanger over the course of about 19 minutes while the melanger was running. 10.2 wt. ounces honey was then added over the course of less than about 1 minute to the ground nut material with grinding in the stone melanger uninterrupted. After about 3 minutes continued grinding after completion of the honey addition, almond oil began to separate from the nut dough. After about 3 minutes continuous grinding, nut oil separation was complete. Yield: 9.7 wt. ounces almond oil; 29.9 wt. ounces defatted almond dough.

The theoretical yield of almond oil from 32 wt. ounces almonds is 16.6 wt. ounces, assuming a 52 wt. % oil content in almonds. Thus, the actual yield was (9.7/16.6)×100%=58.4%. The combined oil plus dough recovery (9.7 wt. ounces+29.9 wt. ounces=39.6 wt. ounces) represented a wastage of only 2.6 wt. ounces and an efficiency of 94%.

Example 7: Cashews/Honey Melangering

In a variation of Example 1, 32 wt. ounces cashews (fruit and shells removed) was added all at once to the bowl of a Spectra 11 stone melanger while the melanger was running. The cashews were ground in the melanger in the absence of carbohydrate for about 28 minutes, after which time 10.3 wt. ounces honey was added to the nut material over the course of about 3 minutes with continuous and uninterrupted grinding. Cashew nut oil separation began almost immediately thereafter. The cashew nut material and the honey mixture was further ground for about 3-4 minutes to complete the oil separation process. Yield: 3.7 wt. ounces cashew oil; 30.8 wt. ounces defatted cashew dough. The theoretical yield of cashew oil from 32 wt. ounces cashews is 14.72 wt. ounces, assuming a 46 wt. % oil content in cashews. Thus, the actual yield was (3.7/14.72)×100%=25.14%. The combined oil plus dough recovery (3.7 wt. ounces+30.8 wt. ounces=34.5 wt. ounces) represented a wastage of 7.8 wt. ounces.

Example 8: Peanuts/Honey Melangering

In a variation of Example 1, 32 wt. ounces shelled peanuts (skins removed) were added all at once to the bowl of a Spectra 11 stone melanger while the melanger was running. The peanuts were ground in the melanger in the absence of carbohydrate for about 24 minutes, after which time 12.1 wt. ounces honey was added to the peanut material over the course of about 1 minute with continuous uninterrupted grinding. Peanut oil separation began after about 3 minutes further grinding. The peanut and honey mixture was further ground for about 3-4 minutes to complete the peanut oil separation process. Yield: 8.6 wt. ounces peanut oil; 31 wt. ounces defatted peanut dough. The theoretical yield of peanut oil from 32 wt. ounces of peanuts is 15.68 wt. ounces, assuming a 49 wt. % oil content in peanuts. Thus, the actual yield was (8.6/15.68)×100%=54.85%. The combined oil plus dough recovery (8.6 wt. ounces+31 wt. ounces=39.6 wt. ounces) represented a wastage of 4.5 wt. ounces.

Example 9: Pecans and Cashews/Honey Melangering

In a variation of Example 1, a mixture of 13.9 wt. ounces cashews (fruit and shells removed) and 22.1 wt. ounces shelled pecans were added all at once to the bowl of a Spectra 11 stone melanger while the melanger was running. The mixture of nuts was ground in the melanger in the absence of carbohydrate for about 25 minutes, after which time 9.0 wt. ounces honey was added to the ground nut material over the course of about 1½ to 2 minutes with continuous uninterrupted grinding. Nut oil separation began after about 2 minutes grinding and was complete after about 1 minute additional grinding. Yield: 11.9 wt. ounces cashew/pecan oil; 24.9 wt. ounces defatted cashew/pecan dough. The theoretical yield of cashew/pecan oil from a mixture of 13.9 wt. ounces cashews and 22.1 wt. ounces pecans is 20.76 wt. ounces, assuming a 46 wt. % oil content in cashews and a 65 wt. % oil content in pecans. Thus, the actual yield was (11.9/20.76)×100%=57.32%. The combined oil plus dough recovery (11.9 wt. ounces+24.9 wt. ounces=36.8 wt. ounces) represented a wastage of 8.2 wt. ounces.

Example 10: Pecans/Agave Syrup Melangering

To the bowl of a running Spectra 11 stone melanger, with the tensioning knob turned 5-turns clockwise, was added 2 Pounds (32 wt. ounces) shelled pecans in less than about 1 minute. The pecans were gradually reduced from pieces to a granular consistency and then ultimately to a creamy nut butter consistency after about 21 minutes of continuous grinding in the melanger. After about 3-4 minutes of this period of grinding, the tensioning knob was turned 11-turns counterclockwise. With continued grinding, 7.3 wt. ounces of agave syrup (grocery brand) was introduced in less than about 1 minute. After addition of the agave syrup, the tensioning knob of the melanger was turned fully clockwise. After about 5-6 minutes of continued grinding in the presence of the agave syrup, the pecan oil began to separate and the pecan dough began to thicken. The pecan oil separation concluded at about 27 minutes from the start of the process. The separated pecan oil was poured off from the pecan dough. Yield: 15.5 wt. ounces pecan oil; 20.0 wt. ounces defatted pecan dough. The theoretical yield of pecan oil from 32 wt. ounces of nuts is 20.8 wt. ounces, assuming a 65 wt. % oil content in pecans. Thus the actual yield was (15.5/20.8)×100%=74.5% yield. The combined oil plus dough recovery (15.5 wt. ounces+20.0 wt. ounces=35.5 wt. ounces) represented a wastage of 3.8 wt. ounces (39.3 wt. ounces-35.5 wt. ounces).

Example 11: Pecans/Table Sugar (Sucrose) Melangering

To the bowl of a running Spectra 11 stone melanger was added 2 Pounds (32 wt. ounces) shelled pecans in less than about 1 minute. The pecans were gradually reduced from pieces to a granular consistency and then ultimately to a creamy nut butter consistency after about 24-25 minutes of continuous grinding in the melanger, after which time 6.8 wt. ounces of granulated sugar (grocery brand of table sugar) was introduced over the course of about 6-7 minutes. Pecan oil separation began before all of the granulated sugar was added, at about 30 minutes into the process. The pecan oil separation concluded at about 37 minutes from the start of the process, or about 5-6 minutes after the end of the sugar addition. At about 33 minutes into the process the tensioning knob was turned fully clockwise, then after about 2 minutes, fully counterclockwise, and then after about another minute, at close to the end of the process, back to fully clockwise. The separated pecan oil was poured off from the pecan dough. Yield: 10.9 wt. ounces pecan oil; 21.4 wt. ounces defatted pecan dough. The theoretical yield of pecan oil from 32 wt. ounces of nuts is 20.8 wt. ounces, assuming a 65 wt. % oil content in pecans. Thus the actual yield was (10.9/20.8)×100%=52.4% yield. The combined oil plus dough recovery (10.9 wt. ounces+21.4 wt. ounces=32.3 wt. ounces) represented a wastage of 6.5 wt. ounces (38.8 wt. ounces-32.3 wt. ounces).

Example 12: Pecans/Agave Syrup Melangering

In a variation of Example 9, 2 pounds (32 wt. ounces) shelled pecans were ground in a Spectra 11 stone melanger for about 25 minutes prior to the addition of 7.0 wt. ounces agave syrup. After completion of the agave syrup addition, the mixture was ground for an additional 8-9 minutes before pecan oil began to separate (about 37 minutes into the process). Oil separation was complete in less than a minute. The separated pecan oil was poured off from the pecan dough. Yield: 14.9 wt. ounces pecan oil; 18.4 wt. ounces defatted pecan dough. The theoretical yield of pecan oil from 32 wt. ounces of nuts is 20.8 wt. ounces, assuming a 65 wt. % oil content in pecans. Thus the actual yield was (14.9/20.8)×100%=71.6% yield. The combined oil plus dough recovery (14.9 wt. ounces+18.4 wt. ounces=33.3 wt. ounces) represented a wastage of 5.7 wt. ounces (39.0 wt. ounces-33.3 wt. ounces).

Examples 13-20: Further Examples of Pecans/Honey Melangering

The following examples (Examples 13-20) generally follow the procedure illustrated in Example 1, and are reported in tabular form below (TABLE 2) for brevity. "% wb" in Table 2 refers to weight percent (wt. %), i.e. percent on a "weight basis." On occasion, a range is shown for time (in mins) rather than entering the precise time actually recorded in minutes and seconds.

TABLE 2

Further Examples of Pecan Oil Separation from the Pecans/Honey Melangering Process.

| Variable or Measurement | EXAMPLE | | | | | | | |
|---|---|---|---|---|---|---|---|---|
| | 13 | 14 | 15 | 16 | 17 | 18 | 19 | 20 |
| Shelled Pecans (wt. oz.) | 32 | 32 | 32 | 32 | 32 | 32 | 32 | 32 |
| Honey (wt. oz.) | 11.5 | 8.9 | 10.1 | 9.6 | 7.8 | 7.6 | 7.8 | 8.0 |
| Percent (%) Honey (% wb) | 26.4 | 21.8 | 24.0 | 23.1 | 19.6 | 19.2 | 19.6 | 20.0 |
| Preliminary grinding prior to honey addition (min) | 25-26 | 25-26 | 30-31 | 30-31 | 32-33 | 32-33 | 31-32 | 29-30 |
| Further grinding in the presence of honey (min) | 7 | 14 | 7-8 | 8-9 | 3-4 | 10-11 | 9-10 | 4-5 |
| Start of oil separation after honey addition (min) | 5 | 11-12 | 3-4 | 4 | 1 | 7-8 | 5 | 3 |
| Total melanger time (min) | 32-33 | 39-40 | 37-38 | 38-39 | 35-36 | 42-43 | 40-41 | 32-33 |
| Pecan Oil obtained (wt. oz.) | 13.2 | 15.1 | 13.0 | 15.4 | 10.3 | 17.7 | 12.9 | 11.0 |
| Defatted nut dough recovered (wt. oz.) | 26.1 | 23.1 | 23.3 | 21.1 | 25.3 | 19.4 | 28.6 | 28.3 |
| Percent (%) yield nut oil | 63.5 | 72.6 | 62.5 | 74.0 | 49.5 | 85.1 | 62.0 | 52.9 |
| Total wasted materials, unrecovered (wt. oz.) | 4.2 | 2.7 | 5.8 | 5.1 | 4.2 | 2.5 | ~0 | <1 |

From Examples 13-20, it is evident that, at least for pecans, the length of time grinding the nut butter in the presence of the honey may be controlling yield of oil, once enough honey is added (e.g., greater than about 15 to 20 wt. % honey). The dramatic difference in the percent (%) yield of pecan oil separated in Examples 17 and 18 show the effect of increased grinding time in the presence of about the same wt. % honey. As evidenced, the process is robust and produces a sufficient recovery of nut oil when the process comprises grinding the nuts to a nut butter consistency prior to the addition of the carbohydrate, and then further grinding in the presence of the carbohydrate for a time sufficient to promote oil separation.

Example 21: Pistachio/Honey Melangering

In a variation of Example 1, 32 wt. ounces shelled pistachio nuts was introduced to the bowl of a Spectra 11 stone melanger over the course of about 1 minute while the melanger was running. 10.4 wt. ounces honey was then added over the course of less than about 1 minute to the ground nut material with grinding in the stone melanger uninterrupted. After about 1 minute of continued grinding after completion of the honey addition, pistachio oil began to separate from the nut dough. After about 2½ minutes continuous grinding, nut oil separation was complete. Yield: 8.0 wt. ounces pistachio oil; 31.1 wt. ounces defatted pistachio dough. The theoretical yield of pistachio oil from 32 wt. ounces pistachios is 15.36 wt. ounces, assuming a 48 wt. % oil content in pistachios. Thus, the actual yield was (8.0/15.36)×100%=52.08%. The combined pistachio oil plus nut dough recovery (8.0 wt. ounces+31.1 wt. ounces=39.1 wt. ounces) represented a wastage of only 3.3 wt. ounces and an efficiency of 92%.

Example 22: Pecans/Honey Melangering in the Presence of Chocolate

The process described in Example 1 was repeated using 32 wt. ounces shelled pecans and 12.1 wt. ounces Desert Blend honey in the Spectra 11 stone melanger, with 4.9 wt. ounces of chocolate added. Yield: 14.8 wt. ounces chocolate infused pecan oil; 28.0 wt. ounces defatted, chocolate flavored pecan dough. The theoretical yield of pecan oil from 32 wt. ounces of nuts is 20.8 wt. ounces, assuming a 65 wt. % oil content in pecans. Thus the actual yield was (14.8/20.8)×100%=71.15% yield. The combined oil plus dough recovery (14.8 wt. ounces+28.0 wt. ounces=42.8 wt. ounces) represented a wastage of 6.2 wt. ounces.

Example 23: Almond/Pomegranate Reduction (PomCon)

As discussed herein, a fruit reduction may be prepared from pomegranate arils. In a variation of Example 1, almond oil recovery comprises grinding together 32 wt. ounces shelled almonds with 18 wt. % PomCon, based on the total weight of the PomCon and shelled almonds. The oil and the dandy co-product acquire various attributes of the pomegranate fruit.

A comparison of nut oil extraction was also made between almond oil prepared by the honey melangering method herein and screw press, solvent extraction, and super critical fluid extraction methods. The comparison is set forth in TABLE 3 below.

TABLE 3

Nut Oil Extraction Comparison

| Oil recovery method | Screw Press | Solvent Extraction | Super critical Fluid | Honey Melangering |
|---|---|---|---|---|
| Starting weight of almonds | 1-pound | 1-pound | 1-pound | 1-pound |
| Starting weight of honey | n/a | n/a | n/a | 5.1 wt. oz. |
| Almond oil extracted | 3.30 wt. oz. | 3.50 wt. oz. | 4.10 wt. oz. | 4.80 wt. oz. |
| Extraction yield | 43% | 45% | 53% | 63% |
| Weight of co-product | 12.70 wt. oz. | 12.50 wt. oz. | 11.90 wt. oz. | 14.95 wt. oz. |
| Appearance of co-product | cake/flour | cake/flour | cake/flour | nut dough (dandy) |

As evident from the data in TABLE 3, the carbohydrate induced nut oil recovery method of the present disclosure is the only method that provided a co-product that is not a cake/flour. As such, the dandy produced in the present method becomes a valuable product for foods and for nut milk production. Further, the honey melangering process provided the highest oil recovery compared to screw press, solvent extraction, and super critical fluid extraction methods.

Comparison of Pecan Oil Obtained from Different Nut Oil Recovery Methods

Without any subsequent filtration step, pecan oil obtained in accordance to the present method was found to have a slightly different nutritional profile and composition compared to expeller-pressed pecan oil. The pecan oil identified as "A-Oil" in TABLE 4 below is pecan oil obtained by the pecans/honey melangering process in accordance with the present disclosure, and specifically is a sample of the pecan oil produced in Example 14 above. Comparative sample designated "B-Oil" is expeller-pressed pecan oil obtained from Kinloch Pecan Plantation, (Winnsboro, La.), labeled as "100% expeller-pressed virgin pecan oil." Samples of A-Oil (Example 14 pecan oil) and B-Oil (expeller-pressed virgin pecan oil) were sent to an independent testing laboratory for nutritional profiles and compositional analyses. The results are set out in TABLE 4 below. In TABLE 4, "% wb" refers to weight percent on a "weight basis." Other units, as well as the referenced test methods, are generally known in the food industry.

TABLE 4

Compositional/Nutritional Comparison of Pecan Oils (A-Oil vs. B-Oil)

| Analyte | A-Oil | B-Oil | Method |
|---|---|---|---|
| Ash (% wb) | ND | ND | AOAC 923.03 |
| Calcium (mg/100 g) | 2.3 | 0.9 | AOAC 985.35/984.27 |
| Calories from Fat (Cal/100 g) | 888 | 900 | Calculation |
| Total Calories (Cal/100 g) | 891 | 900 | Calculation |
| Total Carbohydrates (% wb) | 0.1 | 0.0 | By difference |
| Cholesterol (mg/100 g) | 3.6 | 10.2 | AOAC 994.10 |
| Trans Fat (% wb) | ND | ND | AOAC 996.06 |
| Saturated Fat (% wb) | 12.9 | 14.2 | AOAC 996.06 |
| Total Fat (% wb) | 98.7 | 100 | AOAC 996.06 |
| Dietary Fiber, Total (% wb) | ND | ND | AOAC 985.29 |
| Iron (mg/100 g) | 0.5 | 0.1 | AOAC 985.35/984.27 |
| Moisture (% wb) | 0.4 | ND | AOAC 984.25 |

TABLE 4-continued

Compositional/Nutritional Comparison of Pecan Oils (A-Oil vs. B-Oil)

| Analyte | A-Oil | B-Oil | Method |
|---|---|---|---|
| Protein (% wb) | 0.8 | 0.9 | AOAC 992.15 |
| Sodium (mg/100 g) | 0.5 | ND | AOAC 985.35/984.27 |
| Sugars (Total as sucrose) (% wb) | ND | ND | AOAC 925.05 |
| Vitamin A (Retinol) (IU/100 g) | ND | ND | AOAC 2001.13 |
| Vitamin C (L-Ascorbic Acid) (mg/100 g) | ND | ND | PCHEM 0005 HPLC |

As evidenced from the results set forth in TABLE 4, pecan oil obtained from the methods according to the present disclosure provide oil having less total fat compared to expeller pressed pecan oil. In various embodiments, pecan oil obtained from the present methods comprises a total fat content of less than about 13% by weight. However, the pecan oil obtained from the honey melangering process contained noticeable particulates. After microfiltration, the pecan oil from the honey melangering process was virtually identical to the 100% expeller-pressed virgin pecan oil (B-Oil in TABLE 4). The particulate material may comprise protein, carbohydrate and/or fat.

Seed Oil Recovery Examples

Example 24: Pumpkin Seeds/Banana Fruit Reduction Melangering

A banana fruit reduction was prepared by peeling the skins from 5-pounds of bananas, adding 6 cups of water to the fruit and boiling the water until the bananas became soft and malleable, The bananas were then mashed to a pulp and the mixture strained to separate juice from fruit. The fruit was boiled again with 2 cups of water, and strained again. The combined liquid was then boiled for 10-mins and simmered for 1-hour to produce 32.4 wt. ounces of a high fructose banana fruit reduction.

In a variation of Example 1, 32 wt. ounces shelled pumpkin seeds was introduced to the bowl of a Spectra 11 stone melanger over the course of about 1 minute while the melanger was running. Grinding was continued for about 43 minutes prior to carbohydrate addition. 10.3 wt. ounces of the banana fruit reduction as prepared above was then added over the course of less than about 1 minute to the ground seed material with grinding in the stone melanger uninterrupted, resulting in almost immediate pumpkin seed oil separation. After about 3 minutes of continued grinding, pumpkin seed oil separation was complete. Yield: 9.9 wt. ounces pumpkin seed oil and 28.6 wt. ounces defatted pumpkin seed dandy. The combined pumpkin seed oil plus pumpkin seed dough recovery (9.9 wt. ounces+28.6 wt. ounces=38.5 wt. ounces) represented a wastage of only 3.8 wt. ounces.

Example 25: Sunflower Seeds/Date Fruit Reduction Melangering

A date fruit reduction was prepared by combining 51 wt. ounces of pureed pitted dates and 4 cups of water, and boiling the mixture until the dates were soft and malleable. The mixture was strained to separate juice from fruit. The fruit was boiled again with 2 cups of water, and strained again. The combined liquid was then boiled for 10-mins and simmered for 1-hour to produce 38.5 wt. ounces of a high fructose date fruit reduction.

In a variation of Example 1, 32 wt. ounces shelled sunflower seeds was introduced to the bowl of a Spectra 11 stone melanger over the course of about 1 minute while the melanger was running. Grinding was continued for about 35 minutes prior to carbohydrate addition. 10.6 wt. ounces of the date fruit reduction as prepared above was then added over the course of about 1 minute to the ground seed material. Grinding was continued for about 3-4 minutes before seed oil began separating. After about 8 minutes of continued grinding, sunflower seed oil separation was complete. Yield: 6.3 wt. ounces sunflower seed oil and 31.4 wt. ounces defatted sunflower seed dandy. The combined sunflower seed oil plus sunflower seed dough recovery (6.3 wt. ounces+31.4 wt. ounces=37.7 wt. ounces) represented a wastage of only 4.9 wt. ounces.

Defatted Nut Dough (Dandy) Obtained from the Present Methods

A sample of pecan dandy obtained from the present honey melangering process was submitted to an independent laboratory for nutritional/compositional analysis. The analysis is set forth below in TABLE 5.

TABLE 5

Compositional/Nutritional Analysis of Pecan Nut Dough

| Analyte | Result | Method |
|---|---|---|
| Total Carbohydrates (% wb) | 51.7 | By difference |
| Cholesterol (mg/100 g) | 14.4 | AOAC 994.10 |
| Trans Fat (% wb) | ND | AOAC 996.06 |
| Saturated Fat (% wb) | 3.0 | AOAC 996.06 |
| Total Fat (% wb) | 19.9 | AOAC 996.06 |
| Dietary Fiber, Total (% wb) | 17.1 | AOAC 985.29 |
| Iron (mg/100 g) | 4.5 | AOAC 985.35/984.27 |
| Moisture (% wb) | 10.0 | AOAC 984.25 |
| Protein (% wb) | 16.4 | AOAC 992.15 |
| Sodium (mg/100 g) | 3.2 | AOAC 985.35/984.27 |
| Sugars (Total as sucrose) (% wb) | 23.0 | AOAC 925.05 |
| Vitamin A (Retinol) (IU/100 g) | ND | AOAC 2001.13 |
| Vitamin C (L-Ascorbic Acid) (mg/100 g) | ND | PCHEM 0005 HPLC |

As shown in TABLE 5, the pecan dandy comprises from about 10% by weight to about 30% by weight total fat, based on the total weight of the dandy, and also from about 15% by weight to about 30% by weight total sugars, (reported as sucrose), and based on the total weight of the dandy. The protein to fat ratio (P/F) is from about 0.75 to about 0.90 (w/w). The somewhat large amount of sugars present in the pecan dandy is indication that a significant portion of the carbohydrate used in the process ends up in the dandy rather than in the nut oil. As mentioned, the dandy co-product finds use in food manufacturing and nut milk production.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A non-extraction, non-extrusion method of separating nut oil from shelled nuts, said method comprising:
   grinding at least one variety of shelled nuts in the absence of carbohydrate into a granulate or nut butter;
   adding a source of at least one carbohydrate to said granulate or nut butter to produce a mixture;
   grinding said mixture for a length of time sufficient for the mixture to separate into nut oil and defatted nut dough; and
   recovering the separated nut oil in a yield based on the theoretical oil content of said nuts,
   wherein the at least one carbohydrate induces the mixture to separate into nut oil and defatted nut dough.

2. The method of claim 1, wherein said carbohydrate is present at from about 5% to about 35% by weight, based on the total weight of the shelled nuts and carbohydrate.

3. The method of claim 1, wherein the carbohydrate is chosen from the group consisting of a monosaccharide, a disaccharide, an oligosaccharide, a polysaccharide, and mixtures thereof.

4. The method of claim 1, wherein the carbohydrate comprises at least one of D-fructose, D-glucose, and sucrose.

5. The method of claim 1, wherein said length of time sufficient for the mixture to separate into nut oil and defatted nut dough is less than about 10 minutes.

6. The method of claim 1, wherein the at least one variety of shelled nuts is ground into said granulate or nut butter over the course of about 25 minutes to about 35 minutes.

7. The method of claim 1, wherein said step of grinding said mixture comprises the shearing of the granulate or nut butter and the at least one carbohydrate between stone rollers and stone plate in a motor-driven stone melanger.

8. The method of claim 1, further comprising a step of filtering the separated nut oil.

9. The method of claim 1, wherein said step of grinding at least one variety of shelled nuts in the absence of carbohydrate is for a length of time sufficient to produce nut butter having a viscosity of from about 3,000 cps to about 5,000 cps when measured at a temperature of from about 88° F. to about 93° F.

10. The method of claim 1, wherein the carbohydrate is selected from the group consisting of honey, corn syrup, high fructose corn syrup, maple syrup, agave syrup, cane syrup, simple syrup, molasses, brown rice syrup, glucose syrup, tapioca syrup, rice bran syrup, malt syrup, sorghum, guar gum, treacle, panela, carob syrup, fruit juice, fruit juice concentrate, fruit reduction, and mixtures thereof.

11. The method of claim 1, wherein the variety of shelled nuts is at least one of almonds, pecans, walnuts, cashews, pistachios, peanuts, kola nuts, palm nuts, hazelnuts, filberts, Brazil nuts, macadamia nuts, and chestnuts.

12. The method of claim 1, wherein said length of time sufficient for the mixture to separate into nut oil and defatted nut dough is less than about 30 minutes.

13. The method of claim 1, wherein said mixture comprises a w/w ratio of shelled nuts to carbohydrate of from about 9:1 to about 7:3.

14. The method of claim 1, wherein said yield is from about 25% to about 80%.

15. The method of claim 1, wherein the step of grinding the at least one variety of shelled nuts and the step of grinding the mixture consist of contiguous melangering in a stone melanger, wherein the source of at least one carbohydrate is added to the granulate or to the nut butter during the contiguous melangering.

* * * * *